(12) United States Patent
Yamamoto

(10) Patent No.: US 8,885,377 B2
(45) Date of Patent: Nov. 11, 2014

(54) MATRIX CONVERTER

(75) Inventor: Eiji Yamamoto, Fukuoka (JP)

(73) Assignee: Kabushiki Kaisha Yaskawa Denki, Kitakyushu-Shi (JP)

(*) Notice: Subject to any disclaimer, the term of this patent is extended or adjusted under 35 U.S.C. 154(b) by 85 days.

(21) Appl. No.: 13/444,847

(22) Filed: Apr. 12, 2012

(65) Prior Publication Data

US 2012/0287686 A1    Nov. 15, 2012

(30) Foreign Application Priority Data

May 10, 2011    (JP) ................. 2011-105701

(51) Int. Cl.
| | | |
|---|---|---|
| H02M 5/00 | (2006.01) | |
| H02M 5/293 | (2006.01) | |
| H02M 5/297 | (2006.01) | |

(52) U.S. Cl.
CPC .................. H02M 5/293 (2013.01); H02M 5/297 (2013.01)
USPC ............................ 363/148; 363/50

(58) Field of Classification Search
USPC ........... 363/16–20, 34–41, 46, 49, 74, 78, 87, 363/96, 126, 159; 318/723, 779, 800.801, 318/807, 809
See application file for complete search history.

(56) References Cited

U.S. PATENT DOCUMENTS

| | | | | |
|---|---|---|---|---|
| 6,031,738 A | * | 2/2000 | Lipo et al. ................. | 363/37 |
| 6,046,915 A | * | 4/2000 | Jacobs et al. .............. | 363/39 |
| 7,782,643 B2 | * | 8/2010 | Hara et al. ................ | 363/148 |
| 8,300,426 B2 | * | 10/2012 | Alexander ................. | 363/17 |
| 8,315,077 B2 | * | 11/2012 | Tadano ..................... | 363/157 |
| 2010/0091534 A1 | | 4/2010 | Tadano | |

FOREIGN PATENT DOCUMENTS

| | | |
|---|---|---|
| CN | 101160708 | 4/2008 |
| JP | 11-018489 | 1/1999 |
| KR | 10-0963725 B1 | 6/2010 |
| WO | WO 2006/112275 | 10/2006 |

OTHER PUBLICATIONS

Japanese Office Action for corresponding JP Application No. 2011-105701, Jun. 4, 2013.
Kano et al., "The Matrix Converter Drive Performance Under Abnormal Input Voltage Conditions", IEEE Transactions On Power Electronics, Sep. 2002, pp. 721-730, vol. 17, No. 5.
Korean Office Action for corresponding KR Application No. 2012-0041991, Jul. 1, 2014.
Korean Office Action for corresponding KR Application No. 10-2012-0041991, Jul. 1, 2014.
Chinese Office Action for corresponding CN Application No. 201210119176.X, Sep. 3, 2014.
Taiwanese Office Action for corresponding TW Application No. 101113021, Sep. 23, 2014.

* cited by examiner

*Primary Examiner* — Rajnikant Patel
(74) *Attorney, Agent, or Firm* — Mori & Ward, LLP

(57) ABSTRACT

A matrix converter according to an embodiment includes a control unit generates a highest phase-to-phase voltage among load side phase-to-phase voltages by controlling bidirectional switches that connect phases with respect to the highest phase-to-phase voltage and phases with respect to a highest phase-to-phase voltage among AC-source side phase-to-phase voltages. Moreover, the control unit generates a middle phase-to-phase voltage among the load side phase-to-phase voltages by controlling bidirectional switches that connect phases with respect to the middle phase-to-phase voltage and phases with respect to a middle phase-to-phase voltage among the AC-source side phase-to-phase voltages.

20 Claims, 8 Drawing Sheets

US 8,885,377 B2

MATRIX CONVERTER

CROSS-REFERENCE TO RELATED APPLICATION

This application is based upon and claims the benefit of priority of the prior Japanese Patent Application No. 2011-105701, filed on May 10, 2011, the entire contents of which are incorporated herein by reference.

FIELD

The embodiment discussed herein is directed to a matrix converter.

BACKGROUND

Matrix converters can suppress harmonic current and effectively use regenerative electric power, and therefore attract attention as a new power converter. A matrix converter, for example, includes a plurality of bidirectional switches connecting respective phases of an AC source and respective phases of a load, and outputs arbitrary voltage and frequency to the load by controlling these bidirectional switches and directly switching each phase voltage of the AC source.

The matrix converter performs PWM control on the bidirectional switches and controls its conduction rate, so that a load-side voltage is typically lower than an AC-source-side voltage. However, recently, there is proposed a matrix converter that has a step-up function of causing the load-side voltage to be higher than the AC-source-side voltage.

For example, a matrix converter described in International Publication Pamphlet No. WO 2006/112275 includes reactors on respective phases of an AC source, bidirectional switches, and capacitors that connect respective phases of outputs connected to a load. The matrix converter connects two or more reactors to capacitors after short-circuiting between bidirectional-switch side terminals of the reactors by controlling the bidirectional switches. Consequently, a step-up function of causing a load-side voltage to be higher than an AC-source-side voltage is realized in the matrix converter.

In the matrix converter, it is desired to easily perform control of bidirectional switches.

SUMMARY

A matrix converter according to an embodiment includes a power conversion unit and a control unit. The power conversion unit includes a plurality of bidirectional switches that connect each phase of an AC source and each phase of a load. The control unit generates a highest phase-to-phase voltage among load side phase-to-phase voltages by controlling bidirectional switches that connect phases with respect to the highest phase-to-phase voltage and phases with respect to a highest phase-to-phase voltage among AC-source side phase-to-phase voltages. Moreover, the control unit generates a middle phase-to-phase voltage among the load side phase-to-phase voltages by controlling bidirectional switches that connect phases with respect to the middle phase-to-phase voltage and phases with respect to a middle phase-to-phase voltage among the AC-source side phase-to-phase voltages.

BRIEF DESCRIPTION OF DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF EMBODIMENT

Hereinafter, a matrix converter according to an embodiment will be described in detail based on the drawings. This invention is not limited to this embodiment.

[Configuration of Matrix Converter]

Figure 1:
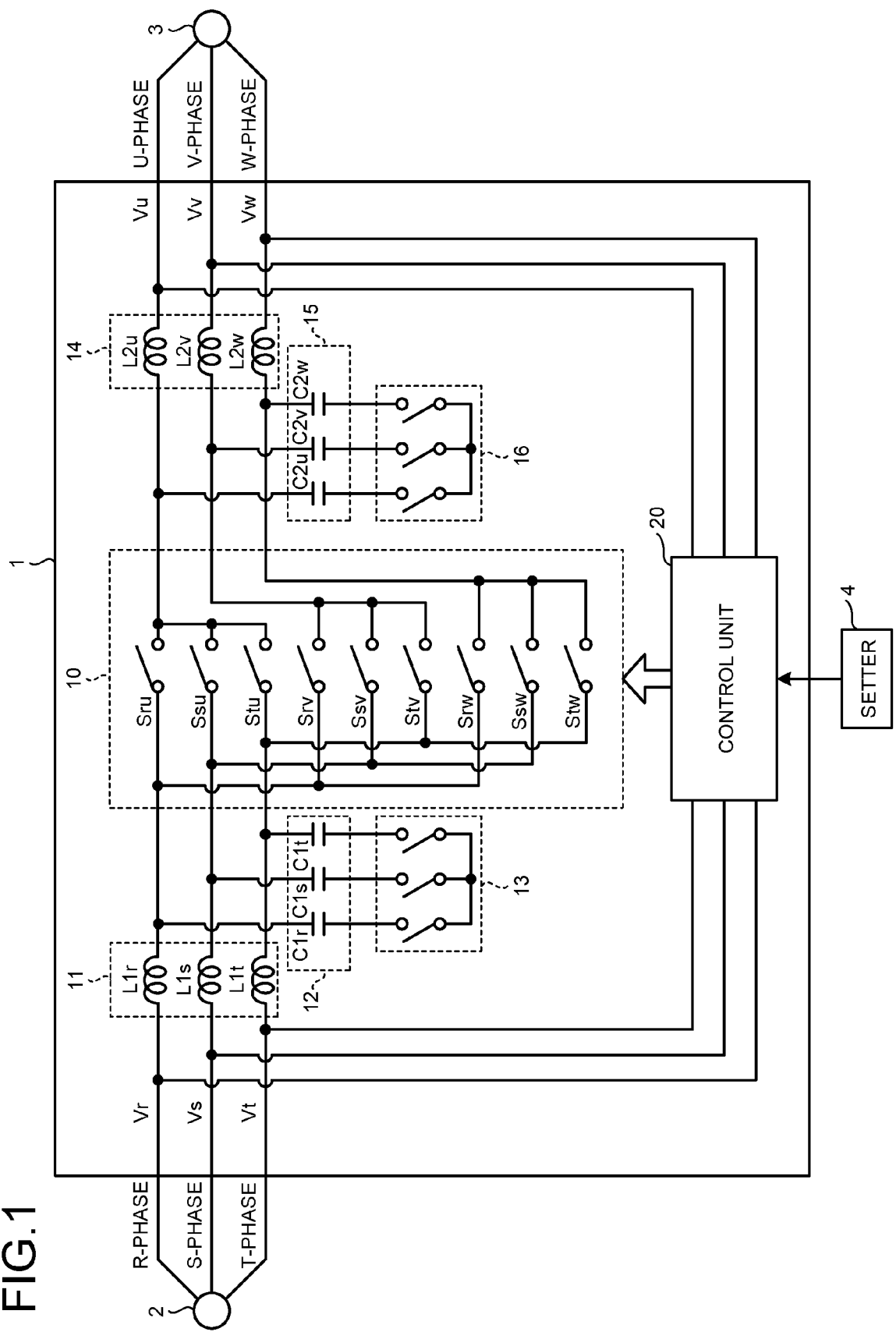
FIG. 1 is a diagram illustrating a configuration of a matrix converter according to an embodiment.

First, the configuration of the matrix converter according to the embodiment is explained with reference to FIG. 1. FIG. 1 is a diagram illustrating a configuration of a matrix converter 1 according to the embodiment. As shown in FIG. 1, the matrix converter 1 according to the embodiment is provided between an AC source 2 and a load 3.

The matrix converter 1 can perform bidirectional power conversion between the AC source 2 and the load 3, and moreover can perform boosting and bucking between the AC source 2 and the load 3. In the matrix converter 1, a direction of power conversion is, for example, determined based on setting from a setting tool 4. As the load 3, an AC generator or an AC motor can be one of examples of the load 3. In the followings, the AC source 2 side is described as an input side and the load 3 side is described as an output side.

As shown in FIG. 1, the matrix converter 1 includes a power converting unit 10, an input-side reactor group 11, an input-side capacitor group 12, an input-side switch 13, an output-side reactor group 14, an output-side capacitor group 15, an output-side switch 16, and a control unit 20.

The power converting unit 10 includes a plurality of bidirectional switches Sru, Ssu, Stu, Srv, Ssv, Stv, Srw, Ssw, and Stw (hereinafter, generically referred to as a bidirectional switch S in some cases) connecting respective phases of the AC source 2 and respective phases of the load 3. The bidirectional switches Sru, Ssu, and Stu connect an R-phase, an S-phase, and a T-phase of the AC source 2 to a U-phase of the load 3, respectively. The bidirectional switches Srv, Ssv, and Stv connect the R-phase, the S-phase, and the T-phase of the AC source 2 to a V-phase of the load 3, respectively. The bidirectional switches Srw, Ssw, and Stw connect the R-phase, the S-phase, and the T-phase of the AC source 2 to a W-phase of the load 3, respectively.

The bidirectional switch S, for example, can comprise anti-parallel connection of two unidirectional switching elements. A semiconductor switch such as an IGBT (Insulated Gate Bipolar Transistor) is one of examples of the switching element. Each semiconductor switch is turned on/off by inputting a signal to a gate of the semiconductor switch, thereby controlling a direction of current flow.

The input-side reactor group 11 includes first reactors L1$r$, L1$s$, and L1$t$ (hereinafter, generically referred to as a first reactor L1 in some cases). The first reactor L1$r$ is provided to be connected between the R-phase of the AC source 2 and the bidirectional switches Sru, Srv, and Srw. The first reactor L1$s$ is provided to be connected between the S-phase of the AC source 2 and the bidirectional switches Ssu, Ssv, and Ssw. The first reactor L1$t$ is provided to be connected between the T-phase of the AC source 2 and the bidirectional switches Stu, Stv, and Stw.

The input-side capacitor group 12 includes first capacitors C1$r$, C1$s$, and C1$t$ (hereinafter, generically referred to as a first capacitor C1 in some cases). The first capacitor C1$r$ is provided to be connected between the first reactor L1$r$ and the input-side switch 13. The first capacitor C1$s$ is provided to be connected between the first reactor L1$s$ and the input-side switch 13. The first capacitor C1$t$ is provided to be connected between the first reactor L1$t$ and the input-side switch 13.

The input-side switch 13 is a switch that connects the other ends of the first capacitors C1$r$, C1$s$, and C1$t$, whose one ends are connected to the bidirectional switches S, to each other. That is, when the input-side switch 13 is on, the other ends of the first capacitors C1$r$, C1$s$, and C1$t$ are connected to each other, and when the input-side switch 13 is off, each of the other ends of the first capacitors C1$r$, C1$s$, and C1$t$ is opened.

The output-side reactor group 14 includes second reactors L2$u$, L2$v$, and L2$w$ (hereinafter, generically referred to as a second reactor L2 in some cases). The second reactor L2$u$ is provided to be connected between the U-phase of the load 3 and the bidirectional switches Sru, Ssu, and Stu. The second reactor L2$v$ is provided to be connected between the V-phase of the load 3 and the bidirectional switches Srv, Ssv, and Stv. The second reactor L2$w$ is provided to be connected between the W-phase of the load 3 and the bidirectional switches Srw, Ssw, and Stw.

The output-side capacitor group 15 includes second capacitors C2$u$, C2$v$, and C2$w$ (hereinafter, generically referred to as a second capacitor C2 in some cases). The second capacitor C2$u$ is provided to be connected between the second reactor L2$u$ and the output-side switch 16. The second capacitor C2$v$ is provided to be connected between the second reactor L2$v$ and the output-side switch 16. The second capacitor C2$w$ is provided to be connected between the second reactor L2$w$ and the output-side switch 16.

The output-side switch 16 is a switch that connects the other ends of the second capacitors C2$u$, C2$v$, and C2$w$, whose one ends are connected to the bidirectional switches S, to each other. That is, when the output-side switch 16 is on, the other ends of the second capacitors C2$u$, C2$v$, and C2$w$ are connected to each other, and when the output-side switch 16 is off, each of the other ends of the second capacitors C2$u$, C2$v$, and C2$w$ is opened.

[Operation Modes of Matrix Converter 1]

Next, operation modes of the matrix converter 1 are explained. The matrix converter 1 has four operation modes, i.e., an A-mode, a B-mode, a C-mode, and a D-mode as shown in Table 1 below.

TABLE 1

| MODE | OPERATION |
|---|---|
| A | STEP-DOWN OPERATION FROM INPUT SIDE TO OUTPUT SIDE |
| B | STEP-UP OPERATION FROM INPUT SIDE TO OUTPUT SIDE |
| C | STEP-DOWN OPERATION FROM OUTPUT SIDE TO INPUT SIDE |
| D | STEP-UP OPERATION FROM OUTPUT SIDE TO INPUT SIDE |

The matrix converter 1 switches a state of the input-side switch 13 and the output-side switch 16 for each operation mode. Specifically, the control unit 20 performs on/off control of the input-side switch 13 and the output-side switch 16 depending on an operation mode to be performed according to Table 2 below.

TABLE 2

| MODE | INPUT-SIDE SWITCH | OUTPUT-SIDE SWITCH |
|---|---|---|
| A | ON | OFF |
| B | OFF | ON |
| C | OFF | ON |
| D | ON | OFF |

[Step-Up Operation of Matrix Converter 1]

Next, a step-up operation by the matrix converter 1 is explained. A step-up operation is performed in the B-mode and the D-mode as shown in Table 2. In this embodiment, an operation in the B-mode is exemplified in order to explain a step-up operation. In the followings, a specific step-up operation is explained after first explaining a basic step-up operation for easy understanding.

Figure 2:
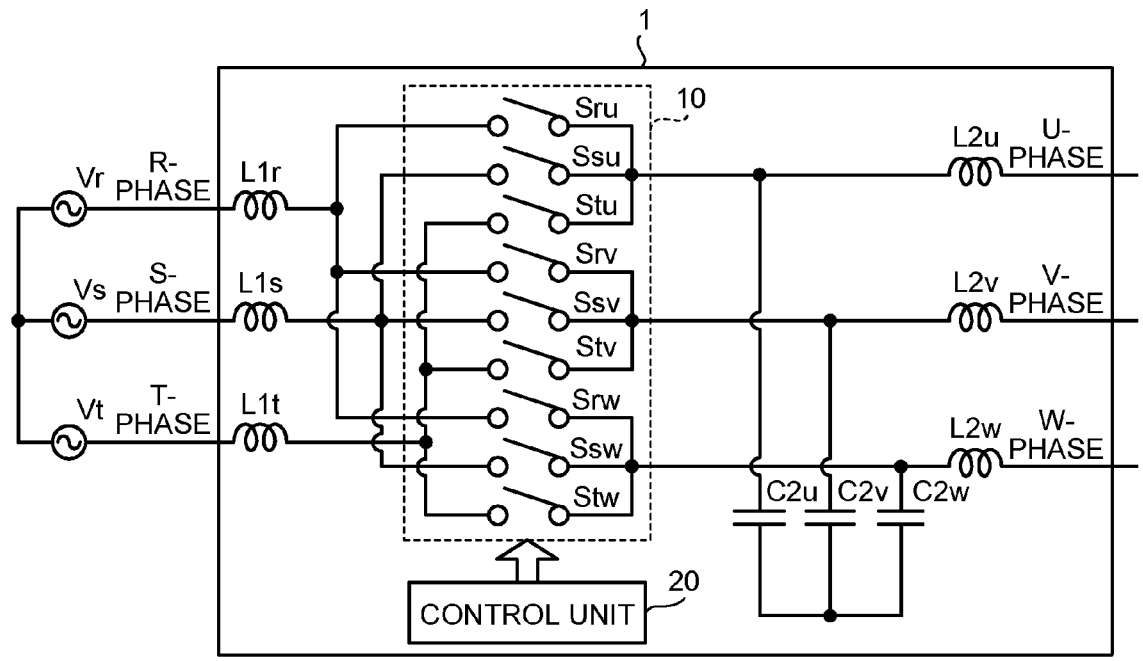
FIG. 2 is an explanatory diagram of a circuit configuration in a B-mode.

In the B-mode, the input-side switch 13 is set off and the output-side switch 16 is set on by the control unit 20. Therefore, in the B-mode, the matrix converter 1 becomes equivalent to the circuit shown in FIG. 2. FIG. 2 is an explanatory diagram of a circuit configuration in the B-mode. In the B-mode, the input-side switch 13 is set off for preventing generation of unnecessary short-circuit current.

After setting the input-side switch 13 and the output-side switch 16, the control unit 20 connects the bidirectional-switch S side terminals of the first reactors L1 to each other. For example, the control unit 20 turns on the bidirectional switches Sru and Ssu. Consequently, the bidirectional-switch S side terminals of the first reactors L1$r$ and L1$s$ are connected to each other via the bidirectional switches Sru and Ssu. Consequently, the R-phase and the S-phase of the AC source 2 are short-circuited via the first reactors L1$r$ and L1$s$, so that short-circuit current flows and magnetic energy is accumulated in the first reactors L1$r$ and L1$s$. In this embodiment, during a step-up operation, the bidirectional bilateral switch Stu is kept in an on state by the control unit 20.

Next, the control unit 20 releases the magnetic energy accumulated in the first reactor L1 to the second capacitor C2 as electric energy. For example, when magnetic energy is accumulated in the first reactors L1$r$ and L1$s$ by turning on the bidirectional switches Sru and Ssu, the control unit 20 turns off the bidirectional switches Ssu and Sru and turns on the bidirectional switches Ssv and Srw. Consequently, the magnetic energy accumulated in the first reactors L1$r$ and L1$s$ is released to the second capacitors C2$v$ and C2$w$, respectively, as electric energy. As a result, an absolute value of a phase-to-phase voltage between the V-phase and the W-phase becomes larger than an absolute value of a phase-to-phase voltage between R-phase and the S-phase by the principle of a step-up chopper, thereby performing boosting.

In this manner, in a step-up operation in the B-mode, because magnetic energy accumulated in the first reactor L1 is accumulated in the second capacitor C2 as electric energy, the bidirectional switches S are controlled to establish a current path from the first reactor L1 to the second capacitor C2.

A step-up operation in the D-mode is also performed by control similar to the B-mode. Specifically, the control unit 20 performs a step-up operation in power conversion from the output side to the input side by accumulating magnetic energy accumulated in the second reactor L2 in the first capacitor C1 as electric energy.

Figure 3:
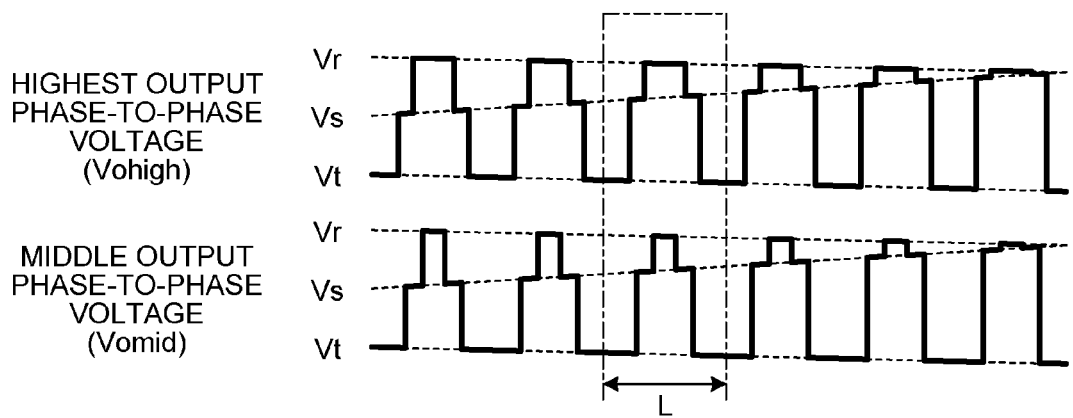
FIG. 3 is a diagram illustrating a control example of bidirectional switches in a step-up operation.

Control as shown in FIG. 3 is considered for easy understanding of a step-up operation of the matrix converter 1. FIG. 3 is a diagram illustrating a control example of the bidirectional switches S in the B-mode that is a step-up operation. In the control shown in FIG. 3, a highest output phase-to-phase voltage (hereinafter, described as highest output phase-to-phase voltage Vohigh) and a middle output phase-to-phase voltage (hereinafter, described as middle output phase-to-phase voltage Vomid) are generated by three input phase voltages Vr, Vs, and Vt of the R-phase, the S-phase, and the T-phase having a magnitude relation shown in FIG. 3.

Figure 4:
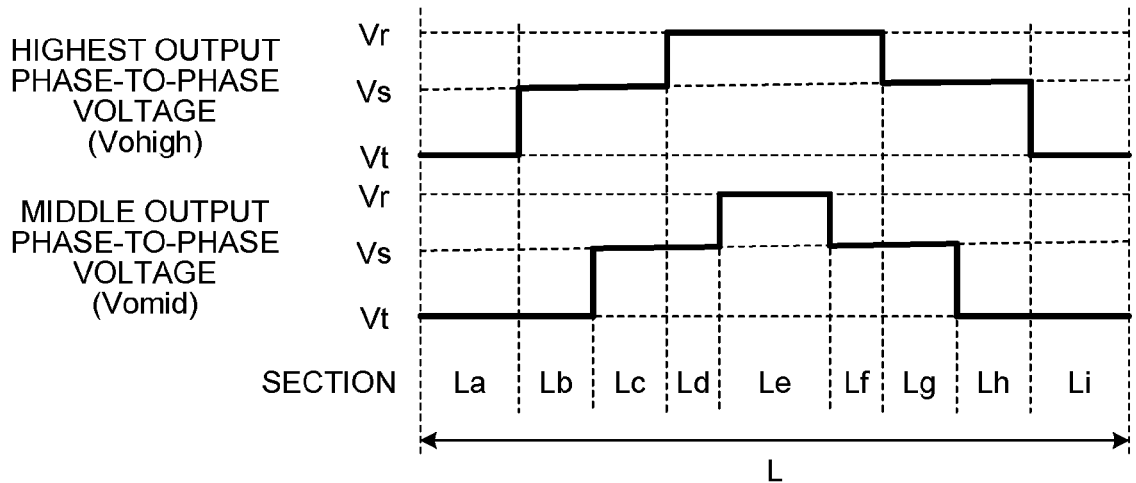
FIG. 4 is an enlarged view of a section L shown in FIG. 3.

A section L shown in FIG. 3 can be divided into nine periods of a division La to a division Li as shown in FIG. 4. FIG. 4 is an enlarged view of the section L shown in FIG. 3. The relationship between the bidirectional switches S to be in an on-state in the division La to the division Li and current paths is shown in Table 3 below. An output phase-to-phase voltage Vuw is the highest output phase-to-phase voltage Vohigh and an output phase-to-phase voltage Vvw is the middle output phase-to-phase voltage Vomid.

In a case of dividing into the first path and the second path, an operation does not become an operation of a basic step-up chopper that does not assume current division. Therefore, step-up control based on a basic formula of a basic step-up chopper determining a step-up ratio cannot be performed, so that a compensation process is performed, which makes a control method complicated. Moreover, for example, in a step-down operation in the A-mode also, the highest output phase-to-phase voltage Vohigh and the middle output phase-to-phase voltage Vomid are generated by three input phases, so that control of the bidirectional switches S becomes complicated.

Thus, in the A-mode and the B-mode, the matrix converter 1 according to the embodiment generates the highest output phase-to-phase voltage Vohigh and the middle output phase-to-phase voltage Vomid by two input phases. Moreover, in the C-mode and the D-mode, the matrix converter 1 generates a highest input phase-to-phase voltage (hereinafter, described as highest input phase-to-phase voltage Vihigh) and a middle input phase-to-phase voltage (hereinafter, described as middle input phase-to-phase voltage Vimid) by two output phases in the similar manner. Consequently, in the matrix converter 1, the current divided state described above can be solved and control of the bidirectional switches S becomes easy.

Figure 6:
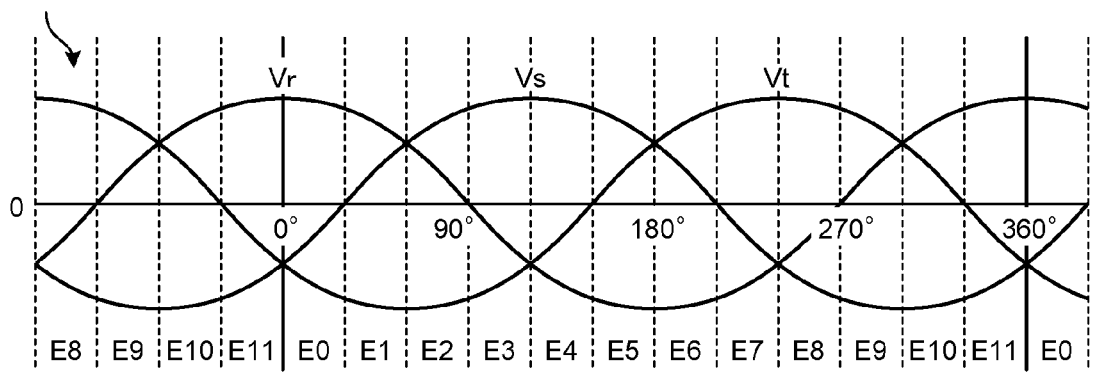
FIG. 6 and FIG. 7 are diagrams illustrating a relationship between input phase voltages and input sections.
Figure 7:
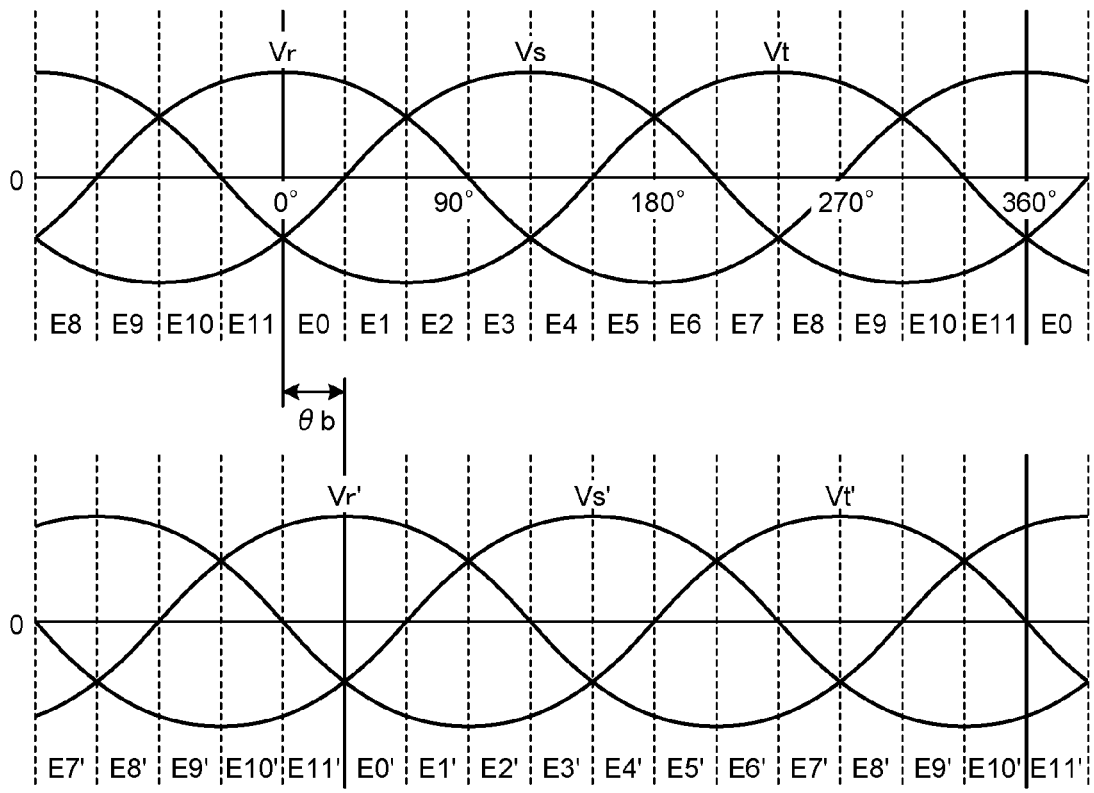
Figure 8:
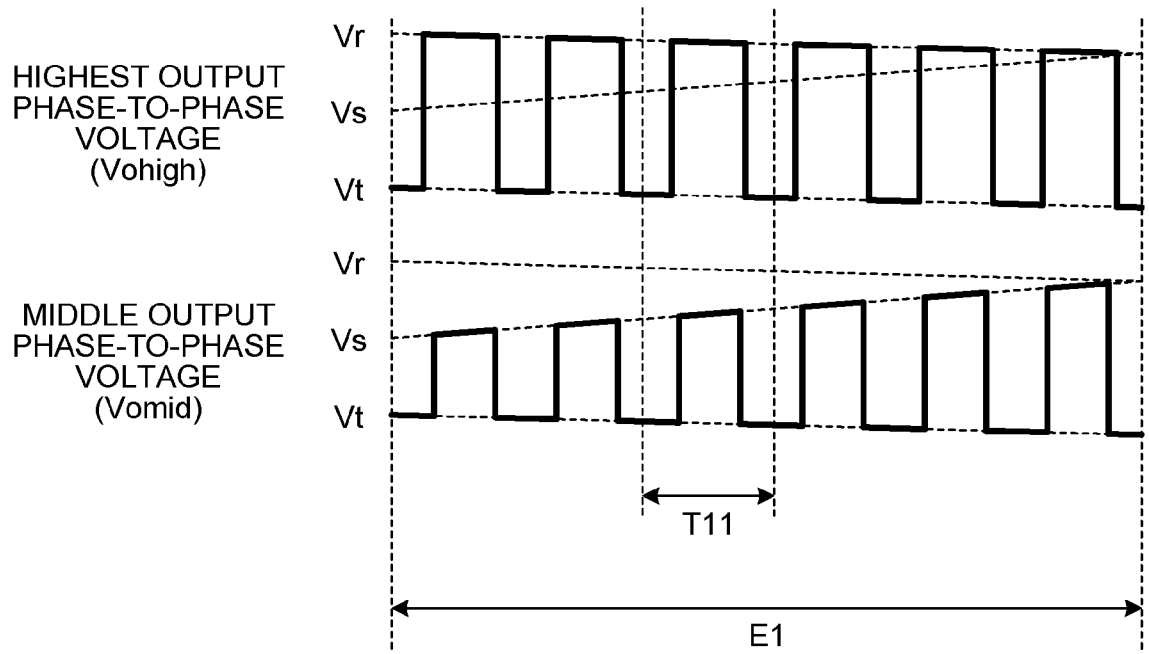
FIG. 8 is a diagram illustrating an example of control of the bidirectional switches by a control unit shown in FIG. 1.

Control of the bidirectional switches S performed in a step-up operation by the control unit 20 is specifically explained below with reference to the drawings. FIG. 6 and FIG. 7 are diagrams illustrating a relationship between voltages of input phases and input sections, and FIG. 8 is a diagram illustrating an example of control of the bidirectional switches S by the control unit 20 shown in FIG. 1. The B-mode and the D-mode are similar operations except that a

TABLE 3

| DIVISION | SWITCH TO BE TURNED ON | CURRENT FLOWING FROM R-PHASE TO T-PHASE | CURRENT FLOWING FROM S-PHASE TO T-PHASE |
|---|---|---|---|
| La, Li | Srw, Ssw, Stw | Vr→L1r→Srw→Stw→L1t→Vt | Vs→L1s→Ssw→Stw→L1t→Vt |
| Lb, Lh | Srw, Ssu, Stw | Vr→L1r→Srw→Stw→L1t→Vt | Vs→L1s→Ssu→C2u→C2w→Stw→L1t→Vt |
| Lc, Lg | Srw, Ssu, Ssv, Stw | Vr→L1r→Srw→Stw→L1t→Vt | Vs→L1s→[Ssu→C2u/Ssv→C2v] (CURRENT DIVIDED) →Cw→Stw→L1t→Vt |
| Ld, Lf | Sru, Ssv, Stw | Vr→L1r→Sru→C2u→C2w→Stw→L1t→Vt | Vs→L1s→Ssv→C2v→C2w→Stw→L1t→Vt |
| Le | Srw, Sru, Srv, Stw | Vr→L1r→[Sru→C2u/Srv→C2v] (CURRENT DIVIDED) →Cw→Stw→L1t→Vt | Vs→L1s→Ssw→Stw→L1t→Vt |

Figure 5:
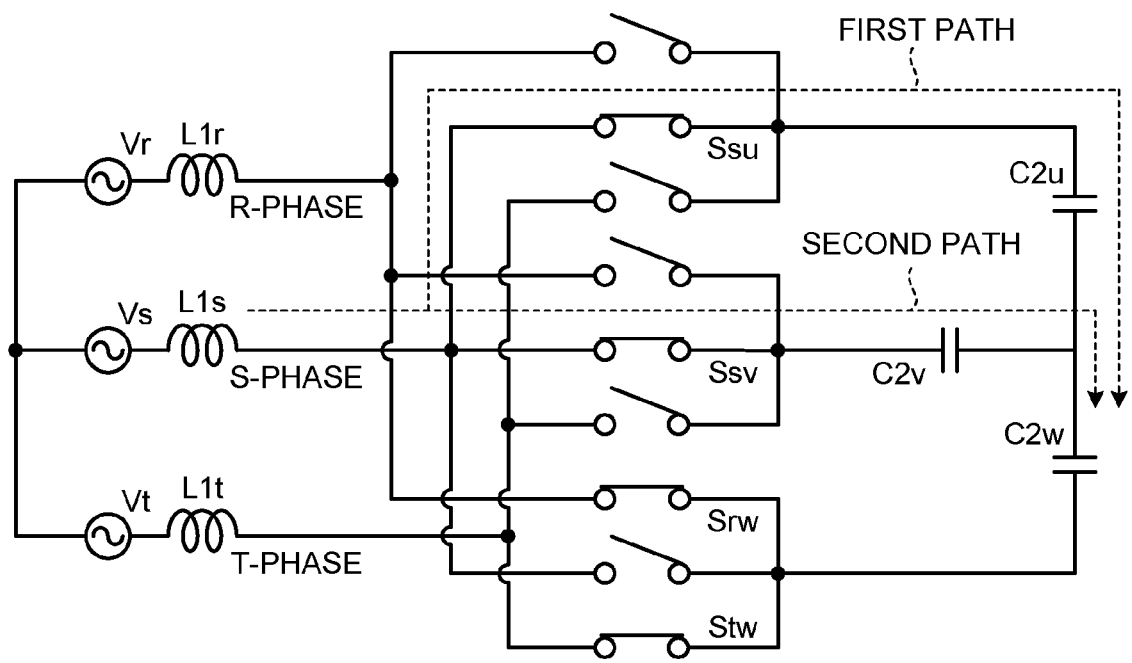
FIG. 5 is a diagram illustrating paths in which current flows in divisions Lc and Lg in Table 3.

In the divisions Lc and Lg shown in Table 3, as shown in FIG. 5, current flowing from the S-phase to the T-phase is divided into a first path passing the bidirectional switch Ssu and the second capacitor C2u and a second path passing the bidirectional switch Ssv and the second capacitor C2v. FIG. 5 is a diagram illustrating paths in which current flows in the divisions Lc and Lg.

Moreover, in the division Le shown in Table 3 also, current flowing from the R-phase to the T-phase is divided into a first path passing the bidirectional switch Sru and the second capacitor C2u and a second path passing the bidirectional switch Sry and the second capacitor C2v.

relationship between input and output is opposite, so that an operation in the B-mode is explained here as an example.

In the A-mode and the B-mode, as shown in FIG. 6, a section is divided into input sections E0 to E11 that are periods in which a magnitude relation of absolute values does not change between three input phase voltages of the R-phase, the S-phase, and the T-phase, that is, a phase, which takes the largest absolute value, a phase, which takes the middle absolute value, and a phase, which takes the smallest absolute value, do not change. The control unit 20 includes a table from which any of the input sections E0 to E11 corresponding to a phase θa of an input voltage to be described later is selected. Then, the control unit 20 detects the phase θa of an input voltage and judges which input section among the input sections E0 to E11 the state of the input phase voltages Vr, Vs, and Vt belongs to based on the phase θa of an input voltage.

Moreover, as shown in FIG. 7, a section can be divided into input sections E0' to E11' based on a phase obtained by adding a predetermined phase difference θb to the phase θa of an input voltage. The input sections E0' to E11' are periods in which a magnitude relation of absolute values does not change in voltages Vr', Vs', and Vt' having the phase difference θb with respect to the input phase voltages Vr, Vs, and Vt.

An input power factor can be adjusted by dividing a section into the input sections E0' to E11'. For example, an input power factor can be set zero by setting the phase difference θb to −90°. In this case, the control unit 20 includes a table from which any of the input sections E0' to E11' corresponding to the phase θa of an input voltage is selected. Then, the control unit 20 detects the phase θa of an input voltage and judges which input section among the input sections E0' to E11' the state of the voltages Vr', Vs', and Vt' belongs to by referring to a table on the base of on a phase obtained by adding the phase difference θb to the phase θa of an input voltage.

That is, the control unit 20 can select the highest input phase-to-phase voltage Vihigh and the middle input phase-to-phase voltage Vimid based on a phase obtained by adding the predetermined phase difference θb to the phase θa of an input voltage. Moreover, the control unit 20 can judge a magnitude relation between the input phase voltages Vr, Vs, and Vt and polarity of a middle phase voltage based on a phase obtained by adding the predetermined phase difference θb to the phase θa of the input phase voltages Vr, Vs, and Vt.

In this manner, the control unit 20 judges which input section among the input sections E0 to E11 or the input sections E0' to E11' the state of the voltages belongs to based on the phase θa of an input voltage. In the followings, explanation is made for a case where the control unit 20 judges an input section from the input sections E0 to E11, however, control is performed in the similar manner also in a case where the control unit 20 judges an input section from the input sections E0' to E11'.

After judging an input section, the control unit 20 turns on the bidirectional switches S that connects phases, to which the highest input phase-to-phase voltage Vihigh is input, to phases that output the highest output phase-to-phase voltage Vohigh. For example, a case is considered in which an input section is the input section E1 shown in FIG. 6 and a phase-to-phase voltage between the U-phase and the W-phase is the highest output phase-to-phase voltage Vohigh. In the input section E1, phases, to which the highest input phase-to-phase voltage Vihigh is input, are the R-phase and the T-phase. Therefore, as shown in FIG. 8, the control unit 20 turns on the bidirectional switch Sru that performs connection between the U-phase and the R-phase and turns on the bidirectional switch Stw that performs connection between the W-phase and the T-phase.

Moreover, the control unit 20 turns on the bidirectional switches S that connects phases, to which the middle input phase-to-phase voltage Vimid is input, to phases that output the middle output phase-to-phase voltage Vomid. For example, a case is considered in which an input section is the input section E1 shown in FIG. 6 and a phase-to-phase voltage between the V-phase and the W-phase is the middle output phase-to-phase voltage Vomid. In the input section E1, phases, to which the middle input phase-to-phase voltage Vimid is input, are the S-phase and the T-phase. Therefore, as shown in FIG. 8, the control unit 20 turns on the bidirectional switch Ssv that performs connection between the V-phase and the S-phase and turns on the bidirectional switch Stw that performs connection between the W-phase and the T-phase.

Figure 9:
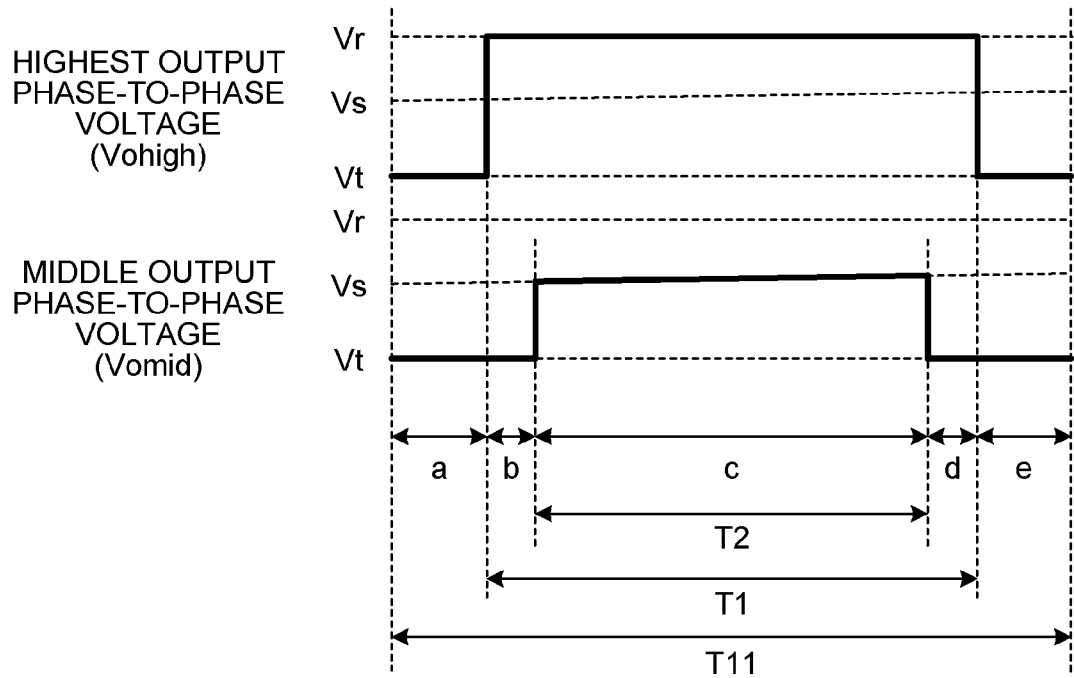
FIG. 9 is an enlarged view of a section T11 shown in FIG. 8.

FIG. 9 is an enlarged view of the section T11 shown in FIG. 1. As shown in FIG. 9, one cycle of a pulse shown in FIG. 8 can be divided into five divisions, i.e., a division a to a division e. The example shown in FIG. 8 illustrates a case of T1>T2. The relationship may become T1<T2 depending on a relationship between input and output, however, only periods of outputting the highest output phase-to-phase voltage Vohigh and the middle output phase-to-phase voltage Vomid become different and a case of T1>T2 is explained below for easy understanding.

In the B-mode, the relationship between the bidirectional switches S to be turned on and current paths is shown in Table 4 in the division a to the division e. The output phase-to-phase voltage Vuw is the highest output phase-to-phase voltage Vohigh and the output phase-to-phase voltage Vvw is the middle output phase-to-phase voltage Vomid.

TABLE 4

| DIVISION | SWITCH TO BE TURNED ON | CURRENT FLOWING FROM R-PHASE TO T-PHASE | CURRENT FLOWING FROM S-PHASE TO T-PHASE |
| --- | --- | --- | --- |
| a, e | Srw, Ssw, Stw | Vr→L1r→Srw→Stw→L1t→Vt | Vs→L1s→Ssw→Stw→L1t→Vt |
| b, d | Sru, Ssw, Stw | Vr→L1r→Sru→C2u→C2w→Stw→L1t→Vt | Vs→L1s→Ssw→Stw→L1t→Vt |
| c | Sru, Ssv, Stw | Vr→L1r→Sru→C2u→C2w→Stw→L1t→Vt | Vs→L1s→Ssv→C2v→C2w→Stw→L1t→Vt |

As shown in Table 4, current flows from the first reactor L1 to the second capacitor C2 without being divided in any of the divisions a to e. Specifically, after accumulating magnetic energy in the first reactors L1r and L1s in the divisions a and e, magnetic energy is released from the first reactor L1r to the second capacitor C2u as electric energy in the divisions b and d. Moreover, in the division c, magnetic energy is released from the first reactor L1r to the second capacitor C2u as electric energy and magnetic energy is released from the first reactor L1s to the second capacitor C2v as electric energy.

Moreover, switch control of the matrix converter 1 in the divisions a to e shown in FIG. 9 can significantly reduce the number of controls of the bidirectional switches S performed in one pulse cycle compared with switch control in the divisions La to Li shown in FIG. 4. Therefore, easy control of the bidirectional switches S can be performed.

In this manner, the matrix converter 1 according to the embodiment generates each of the highest output phase-to-phase voltage Vohigh and the middle output phase-to-phase voltage Vomid by one input phase-to-phase voltage in the B-mode that is a step-up operation, so that the above current divided state can be solved and control of the bidirectional switches S can be easily performed. Moreover, in the case of the D-mode that is a step-up operation, the matrix converter 1 generates each of the highest input phase-to-phase voltage Vihigh and the middle input phase-to-phase voltage Vimid by one output phase-to-phase voltage in the similar manner, so that the above current divided state can be eliminated and control of the bidirectional switches S can be easily performed.

[Configuration of Control Unit 20]

Figure 10:
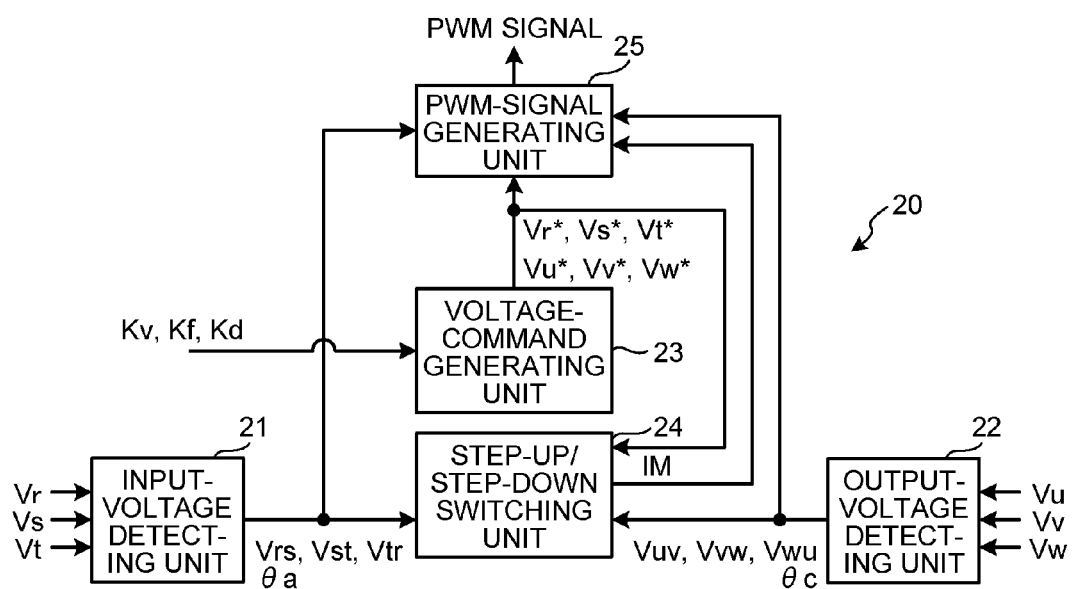
FIG. 10 is a diagram illustrating the configuration of the control unit shown in FIG. 1.

The configuration of the control unit 20 of the matrix converter 1 is specifically explained below. FIG. 10 is a diagram illustrating the configuration of the control unit 20 shown in FIG. 1. As shown in FIG. 10, the control unit 20 includes an input-voltage detecting unit 21, an output-voltage detecting unit 22, a voltage-command generating unit 23, a step-up/step-down switching unit 24, and a PWM-signal generating unit 25.

The input-voltage detecting unit 21 detects voltage on the input side. Specifically, the input-voltage detecting unit 21 detects values of phase-to-phase voltages Vrs, Vst, and Vtr (hereinafter, described as input phase-to-phase voltages Vrs, Vst, and Vtr) of the AC source 2 at connection points between respective phases of the R-phase, the S-phase, and the T-phase of the AC source 2 and the first reactors L1. The input phase-to-phase voltage Vrs is voltage between the R-phase and the S-phase, the input phase-to-phase voltage Vst is voltage between the S-phase and the T-phase, and the input phase-to-phase voltage Vtr is voltage between the T-phase and the R-phase. Moreover, the input-voltage detecting unit 21 detects the phase θa of an input voltage.

The output-voltage detecting unit 22 detects voltage on the output side. Specifically, the output-voltage detecting unit 22 detects values of phase-to-phase voltages Vuv, Vvw, and Vwu (hereinafter, described as output phase-to-phase voltages Vuv, Vvw, and Vwu) of the AC source 2 at connection points between respective phases of the U-phase, the V-phase, and the W-phase on the load 3 side and the second reactors L2. The output phase-to-phase voltage Vuv is voltage between the U-phase and the V-phase, the output phase-to-phase voltage Vvw is voltage between the V-phase and the W-phase, and the output phase-to-phase voltage Vwu is voltage between the W-phase and the U-phase. Moreover, the output-voltage detecting unit 22 detects a phase θc of an output voltage.

The voltage-command generating unit 23 determines a power conversion direction based on power conversion direction information Kd set by the setting tool 4 (see FIG. 1). Specifically, the voltage-command generating unit 23 determines whether power conversion is performed by generating voltage to the load 3 side with reference to voltage on the AC source 2 side (hereinafter, described as output-direction power conversion) or is performed by generating voltage to the AC source 2 side with reference to voltage on the load 3 side (hereinafter, described as input-direction power conversion) based on the power conversion direction information Kd.

Moreover, the voltage-command generating unit 23 generates a voltage command according to a voltage setting value Kv, a frequency setting value Kf, and the power conversion direction information Kd and outputs it to the PWM-signal generating unit 25 and the step-up/step-down switching unit 24. The voltage setting value Kv and the frequency setting value Kf are information set in the voltage-command generating unit 23 by the setting tool 4.

For example, when the power conversion direction information Kd is information indicating the output-direction power conversion, the voltage-command generating unit 23 generates output voltage commands Vu*, Vv*, and Vw* according to the voltage setting value Kv and the frequency setting value Kf. That is, the voltage-command generating unit 23 generates the output voltage commands Vu*, Vv*, and Vw* that causes voltage on the output side to correspond to voltage according to the voltage setting value Kv and the frequency setting value Kf.

On the other hand, when the power conversion direction information Kd is information indicating the input-direction power conversion, the voltage-command generating unit 23 generates input voltage commands Vr*, Vs*, and Vt* according to the voltage setting value Kv and the frequency setting value Kf. That is, the voltage-command generating unit 23 generates the input voltage commands Vr*, Vs*, and Vt* that causes voltage on the input side to correspond to voltage according to the voltage setting value Kv and the frequency setting value Kf.

The step-up/step-down switching unit 24 selects any operation mode from four operation modes (see Table 1 described above), i.e., the A-mode, the B-mode, the C-mode, and the D-mode, and notifies the PWM-signal generating unit 25 of information indicating information IM on the selected operation mode.

Selection of an operation mode by the step-up/step-down switching unit 24 is performed based on the power conversion direction information Kd, the values of the input phase-to-phase voltages Vrs, Vst, and Vtr, and the values of the output phase-to-phase voltages Vuv, Vvw, and Vwu. The step-up/step-down switching unit 24 obtains the power conversion direction information Kd from the voltage-command generating unit 23, obtains the values of the input phase-to-phase voltages Vrs, Vst, and Vtr from the input-voltage detecting unit 21, and obtains the values of the output phase-to-phase voltages Vuv, Vvw, and Vwu from the output-voltage detecting unit 22.

When the power conversion direction information Kd is the output-direction power conversion, the step-up/step-down switching unit 24 detects an input voltage value Va based on the values of the input phase-to-phase voltages Vrs, Vst, and Vtr. Specifically, the step-up/step-down switching unit 24 sets the largest absolute value among the input phase-to-phase voltages Vrs, Vst, and Vtr as the input voltage value Va.

Moreover, when the power conversion direction information Kd is the output-direction power conversion, the step-up/step-down switching unit 24 calculates output phase-to-phase voltage commands Vuv*, Vvw*, and Vwu* from the output voltage commands Vu*, Vv*, and Vw*. Specifically, the step-up/step-down switching unit 24 obtains the output phase-to-phase voltage command Vuv* by Vu*-Vv*, obtains the output phase-to-phase voltage command Vvw* by Vv*-Vw*, and obtains the output phase-to-phase voltage command Vwu* by Vw*-Vu*. Then, the step-up/step-down switching unit 24 sets the largest absolute value among the output phase-to-phase voltage commands Vuv*, Vvw*, and Vwu* as an output voltage command value Vb*.

When the power conversion direction information Kd indicates the output-direction power conversion and a value Vc according to the input voltage value Va is the output voltage command value Vb* or more, the step-up/step-down switching unit 24 selects the A-mode. The "value Vc according to the input voltage value Va" is a value for judging whether voltage according to the voltage setting value Kv can be set to voltage of an output phase by a step-down operation. For example, when the largest value of an output voltage that can be generated by a step-down operation is Va×k1 with respect to the input voltage value Va, the "value Vc according to the input voltage value Va" is set to Va×k1 in the step-up/step-down switching unit 24.

Moreover, when the power conversion direction information Kd indicates the output-direction power conversion and the value Vc according to the input voltage value Va is less than the output voltage command value Vb*, the step-up/step-down switching unit 24 selects the B-mode.

On the other hand, when the power conversion direction information Kd is the input-direction power conversion, the step-up/step-down switching unit 24 detects an output voltage value Vb based on the output phase-to-phase voltages Vuv, Vvw, and Vwu. Specifically, the step-up/step-down switching unit 24 sets the largest absolute value among the output phase-to-phase voltages Vuv, Vvw, and Vwu as the output voltage value Vb.

Moreover, when the power conversion direction information Kd is the input-direction power conversion, the step-up/step-down switching unit 24 calculates input phase-to-phase voltage commands Vrs*, Vst*, and Vtr* from the input voltage commands Vr*, Vs*, and Vt*. Specifically, the step-up/step-down switching unit 24 obtains the input phase-to-phase voltage command Vrs* by Vr*-Vs*, obtains the input phase-to-phase voltage command Vst* by Vs*-Vt*, and obtains the input phase-to-phase voltage command Vtr* by Vt*-Vr*. Then, the step-up/step-down switching unit 24 sets the largest absolute value among the input phase-to-phase voltage commands Vrs*, Vst*, and Vtr* as an input voltage command value Va*.

When the power conversion direction information Kd indicates the input-direction power conversion and a value Vd according to the output voltage value Vb is the input voltage command value Va* or more, the step-up/step-down switching unit 24 selects the C-mode. The "value Vd according to the output voltage value Vb" is a value for judging whether voltage according to the voltage setting value Kv can be set to voltage of an input phase by a step-down operation. For example, when the largest value of an input voltage that can be generated by a step-down operation is Vb×k2 with respect to the output voltage value Vb, the "value Vd according to the output voltage value Vb" is set to Vb×k2 in the step-up/step-down switching unit 24.

Moreover, when the power conversion direction information Kd indicates the input-direction power conversion and the value Vd according to the output voltage value Vb is less than the input voltage command value Va*, the step-up/step-down switching unit 24 selects the D-mode.

In this manner, the step-up/step-down switching unit 24 judges a magnitude relation between the value Vc according to the input voltage value Va and the output voltage command value Vb* and a magnitude relation between the value Vd according to the output voltage value Vb and the input voltage command value Va*. Then, the step-up/step-down switching unit 24 judges any operation mode among the A-mode, the B-mode, the C-mode, and the D-mode based on the judgment result and the power conversion direction information Kd.

The PWM-signal generating unit 25 performs on/off control of the input-side switch 13 and the output-side switch 16 according to the rule in Table 2 depending on the operation mode. Moreover, the PWM-signal generating unit 25 obtains information indicating an operation mode selected by the step-up/step-down switching unit 24 from the step-up/step-down switching unit 24 and generates a PWM signal according to the operation mode. Then, the PWM-signal generating unit 25 outputs the generated PWM signal to the power converting unit 10.

For example, when information on an operation mode indicates the A-mode or the B-mode, the PWM-signal generating unit 25 obtains the values of the input phase-to-phase voltages Vrs, Vst, and Vtr and the phase θa of an input voltage from the input-voltage detecting unit 21. Then, the PWM-signal generating unit 25 judges which input section among the input sections E0 to E11 the state of the input phases belongs to based on the obtained information. Moreover, as will be described later, the PWM-signal generating unit 25 judges which output section among output sections F0 to F5 (see FIG. 13) to be described later the state of the output voltage commands belongs to based on the values of the output voltage commands Vu*, Vv*, and Vw*. Then, as will be described later, the PWM-signal generating unit 25 generates a PWM signal that turns on/off the bidirectional switches S based on the judged input section and output section.

On the other hand, when information on an operation mode indicates the C-mode or the D-mode, the PWM-signal generating unit 25 obtains the values of the output phase-to-phase voltages Vuv, Vvw, and Vwu and the phase θc of an output voltage from the output-voltage detecting unit 22. Then, the PWM-signal generating unit 25 reads the output phase-to-phase voltages Vuv, Vvw, and Vwu as the input phase-to-phase voltages Vrs, Vst, and Vtr, respectively, and judges which input section among the input sections E0 to E11 shown in FIG. 7 the state of the output phases belongs to. Moreover, the PWM-signal generating unit 25 reads the input voltage commands Vr*, Vs*, and Vt* as the output voltage commands Vu*, Vv*, and Vw*, respectively, and judges which output section among the output sections F0 to F5 shown in FIG. 13 the state of the input voltage commands Vr*, Vs*, and Vt* belongs to. Then, as will be described later, the PWM-signal generating unit 25 generates a PWM signal that turns on/off the bidirectional switches S based on the judged output section and input section.

Figure 11:
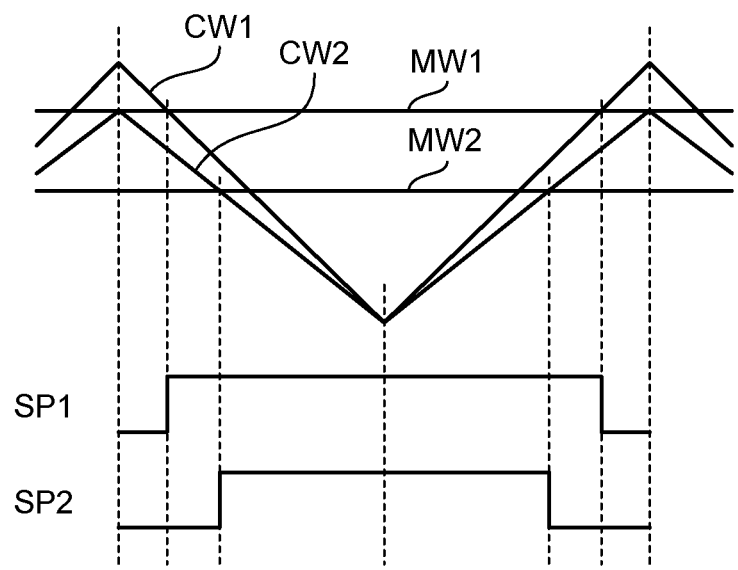
FIG. 11 and FIG. 12 are explanatory diagrams of a generating method of a PWM signal by a PWM-signal generating unit shown in FIG. 10.
Figure 12:
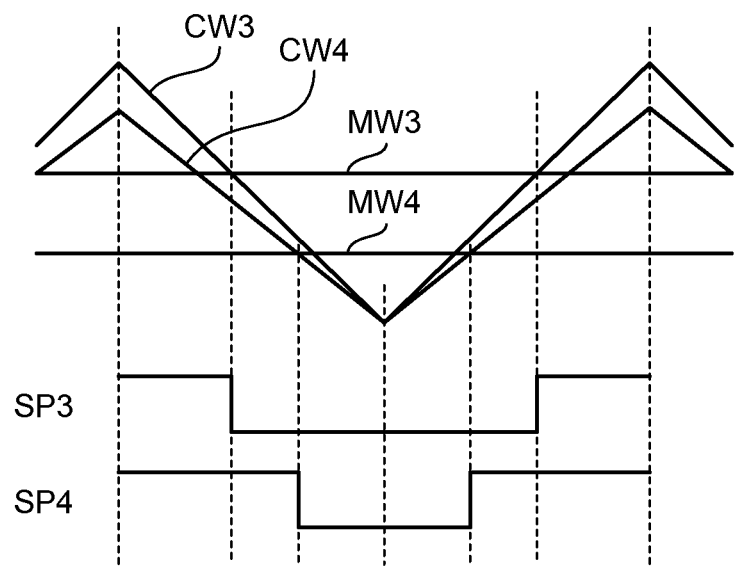

The PWM-signal generating unit 25 generates a modulation wave and a carrier and generates a PWM signal that turns on/off the bidirectional switches S of the power converting unit 10 by comparing them. FIG. 11 and FIG. 12 are explanatory diagrams of a generating method of a PWM signal by the PWM signal generating unit 25 shown in FIG. 10.

When information on an operation mode indicates the A-mode or the B-mode, as shown in FIG. 11, the PWM-signal generating unit 25 generates a PWM signal SP1 for the highest output phase-to-phase voltage Vohigh by comparing a carrier CW1 with a modulation wave MW1. Moreover, the PWM-signal generating unit 25 generates a PWM signal SP2 for the middle output phase-to-phase voltage Vomid by comparing a carrier CW2 with a modulation wave MW2.

When information on an operation mode indicates the C-mode or the D-mode, as shown in FIG. 12, the PWM-signal generating unit 25 generates a PWM signal SP3 for the highest input phase-to-phase voltage Vihigh by comparing a carrier CW3 with a modulation wave MW3. Moreover, the PWM-signal generating unit 25 generates a PWM signal SP4 for the middle input phase-to-phase voltage Vimid by comparing a carrier CW4 with a modulation wave MW4.

The PWM-signal generating unit 25 generates the amplitudes of the carriers CW1 to CW4 and the modulation waves MW1 to MW4 according to Table 5.

TABLE 5

| MODE | AMPLITUDE OF CARRIER VOLTAGE | MAGNITUDE OF MODULATION WAVE VOLTAGE |
|---|---|---|
| A | INPUT VOLTAGE DETECTION VALUE | OUTPUT PHASE-TO-PHASE VOLTAGE COMMAND |
| B | OUTPUT PHASE-TO-PHASE VOLTAGE COMMAND | INPUT VOLTAGE DETECTION VALUE |
| C | OUTPUT VOLTAGE DETECTION VALUE | INPUT PHASE-TO-PHASE VOLTAGE COMMAND |
| D | INPUT PHASE-TO-PHASE VOLTAGE COMMAND | OUTPUT VOLTAGE DETECTION VALUE |

When an operation mode is the A-mode, as shown in Table 5, the PWM-signal generating unit 25 adjusts the amplitude of the carrier CW1 based on an input voltage detection value Vin1 and moreover, adjusts the amplitude of the carrier CW2 based on an input voltage detection value Vin2. The input voltage detection value Vin1 is the largest absolute value among the input phase-to-phase voltages Vrs, Vst, and Vtr and the input voltage detection value Vin2 is the second largest absolute value among the input phase-to-phase voltages Vrs, Vst, and Vtr.

Moreover, in the similar manner to the step-up/step-down switching unit 24 described above, the PWM-signal generating unit 25 generates the output phase-to-phase voltage commands Vuv*, Vvw*, and Vwu* from the output voltage commands Vu*, Vv*, and Vw*. The PWM-signal generating unit 25 sets the largest absolute value among the output phase-to-phase voltage commands Vuv*, Vvw*, and Vwu* as a highest output phase-to-phase voltage command Vohigh* and sets the second largest absolute value among the output phase-to-phase voltage commands Vuv*, Vvw*, and Vwu* as a middle output phase-to-phase voltage command Vomid*. Then, as shown in Table 5, the PWM-signal generating unit 25 adjusts the magnitude of the modulation wave MW1 based on the instantaneous value of the highest output phase-to-phase voltage command Vohigh* and adjusts the magnitude of the modulation wave MW2 based on the instantaneous value of the middle output phase-to-phase voltage command Vomid*.

Moreover, when an operation mode is the A-mode, the PWM-signal generating unit 25 turns on the input-side switch 13 and turns off the output-side switch 16. Consequently, a filter circuit composed of the first reactors L1 and the first capacitors C1 is formed between the AC source 2 and the power converting unit 10.

In the A-mode, an on period Ton and an off period Toff are determined based on the principle of a step-down chopper. That is, the bidirectional switches S are controlled so that the on period Ton and the off period Toff have a relationship as shown in the following Equations (1) and (2) by a PWM signal output from the PWM-signal generating unit 25.

$$(Ton1+Toff1)/Ton1=Vin1/Vohigh* \quad (1)$$

$$(Ton2+Toff2)/Ton2=Vin2/Vomid* \quad (2)$$

Ton1: on period Ton when generating the highest output phase-to-phase voltage Vohigh
Toff1: off period Toff when generating the highest output phase-to-phase voltage Vohigh
Ton2: on period Ton when generating the middle output phase-to-phase voltage Vomid
Toff2: off period Toff when generating the middle output phase-to-phase voltage Vomid When an operation mode is the B-mode, the PWM-signal generating unit 25 generates the output phase-to-phase voltage commands Vuv*, Vvw*, and Vwu* from the output voltage commands Vu*, Vv*, and Vw*. The PWM-signal generating unit 25 sets the largest absolute value among the output phase-to-phase voltage commands Vuv*, Vvw*, and Vwu* as an output phase-to-phase voltage command Vo1* and sets the second largest absolute value among the output phase-to-phase voltage commands Vuv*, Vvw*, and Vwu* as an output phase-to-phase voltage command Vo2*. As shown in Table 5, the PWM-signal generating unit 25 adjusts the amplitudes of the carrier CW1 and the carrier CW2 based on the output phase-to-phase voltage command Vo1* and the output phase-to-phase voltage command Vo2*, respectively.

Moreover, the PWM-signal generating unit 25 adjusts the magnitude of the modulation wave MW1 based on the instantaneous value of the highest input phase-to-phase voltage Vihigh and adjusts the magnitude of the modulation wave MW2 based on the instantaneous value of the middle input phase-to-phase voltage Vimid. For example, when the state of input phases belongs to the section E0 shown in FIG. 6, the highest input phase-to-phase voltage Vihigh is the absolute value of the input phase-to-phase voltage Vrt and the middle input phase-to-phase voltage Vimid is the absolute value of the input phase-to-phase voltage Vrs. Therefore, in this case, the PWM-signal generating unit 25 adjusts the magnitude of the modulation wave MW1 based on the instantaneous absolute value of the input phase-to-phase voltage Vrt and adjusts the magnitude of the modulation wave MW2 based on the instantaneous absolute value of the input phase-to-phase voltage Vrs.

Moreover, when an operation mode is the B-mode, the PWM-signal generating unit 25 turns off the input-side switch 13 and turns on the output-side switch 16. Consequently, a step-up circuit composed of the first reactors L1, the bidirectional switches S, and the second capacitors C2 is formed.

In the B-mode, the on period Ton and the off period Toff are determined based on the principle of a step-up chopper. That is, the bidirectional switches S are controlled so that the on period Ton and the off period Toff have a relationship as shown in the following Equations (3) and (4) by a PWM signal output from the PWM-signal generating unit 25.

$$Toff3/(Ton3+Toff3)=Vihigh/Vo1* \quad (3)$$

$$Toff4/(Ton4+Toff4)=Vimid/Vo2* \quad (4)$$

Ton3: on period Ton when generating the highest input phase-to-phase voltage Vihigh
Toff3: off period Toff when generating the highest input phase-to-phase voltage Vihigh
Ton4: on period Ton when generating the middle input phase-to-phase voltage Vimid
Toff4: off period Toff when generating the middle input phase-to-phase voltage Vimid When an operation mode is the C-mode, as shown in Table 5, the PWM-signal generating unit 25 adjusts the amplitudes of the carrier CW3 and the carrier CW4 based on an output voltage detection value Vo1 and an output voltage detection value Vo2, respectively. The output voltage detection value Vo1 is the largest absolute value among the output phase-to-phase voltages Vuv, Vvw, and Vwu and the output voltage detection value Vo2 is the second largest absolute value among the output phase-to-phase voltages Vuv, Vvw, and Vwu.

In the similar manner to the step-up/step-down switching unit 24 described above, the PWM-signal generating unit 25 generates the input phase-to-phase voltage commands Vrs*, Vst*, and Vtr* from the input voltage commands Vr*, Vs*, and Vt*. The PWM-signal generating unit 25 sets an input phase-to-phase voltage command Vihigh* whose absolute value is the largest among the input phase-to-phase voltage commands Vrs*, Vst*, and Vtr*, and sets an input phase-to-phase voltage command Vimid* whose absolute value is the second largest among the input phase-to-phase voltage commands Vrs*, Vst*, and Vtr*. Then, the PWM-signal generating unit 25 adjusts the magnitude of the modulation wave MW3 based on the instantaneous value of the highest input phase-to-phase voltage command Vihigh* and adjusts the magnitude of the modulation wave MW4 based on the instantaneous value of the middle input phase-to-phase voltage command Vimid*.

Moreover, when an operation mode is the C-mode, the PWM-signal generating unit 25 turns off the input-side switch 13 and turns on the output-side switch 16. Consequently, a filter circuit composed of the second reactors L2 and the second capacitors C2 is formed between the power converting unit 10 and the load 3. In the C-mode, in the similar manner to the A-mode, the on period Ton and the off period Toff are determined based on the principle of a step-down chopper.

When an operation mode is the D-mode, the PWM-signal generating unit 25 generates the input phase-to-phase voltage commands Vrs*, Vst*, and Vtr* from the input voltage commands Vr*, Vs*, and Vt*. The PWM-signal generating unit 25 sets an input phase-to-phase voltage command Vi1* whose absolute value is the largest among the input phase-to-phase voltage commands Vrs*, Vst*, and Vtr*, and sets an input phase-to-phase voltage command Vi2* whose absolute value is the second largest among the input phase-to-phase voltage commands Vrs*, Vst*, and Vtr*. The PWM-signal generating unit 25 adjusts the amplitudes of the carrier CW3 and the carrier CW4 based on the input phase-to-phase voltage command Vi1* and the input phase-to-phase voltage command Vi2*, respectively.

Moreover, the PWM-signal generating unit 25 adjusts the magnitude of the modulation wave MW3 based on the instantaneous value of the highest output phase-to-phase voltage Vohigh and adjusts the magnitude of the modulation wave MW4 based on the instantaneous value of the middle output phase-to-phase voltage Vomid. For example, the highest output phase-to-phase voltage Vohigh is the output phase-to-phase voltage Vuw and the middle output phase-to-phase voltage Vomid is the output phase-to-phase voltage Vuv. In this case, the PWM-signal generating unit 25 adjusts the magnitude of the modulation wave MW3 based on the instantaneous value of the output phase-to-phase voltage Vuw and adjusts the magnitude of the modulation wave MW4 based on the instantaneous value of the output phase-to-phase voltage Vuv.

Moreover, when an operation mode is the D-mode, the PWM-signal generating unit 25 turns on the input-side switch 13 and turns off the output-side switch 16. Consequently, a step-up circuit composed of the second reactors L2, the bidirectional switches S, and the first capacitors C1 is formed. In the D-mode, in the similar manner to the B-mode, the on period Ton and the off period Toff are determined based on the principle of a step-up chopper.

Figure 13:
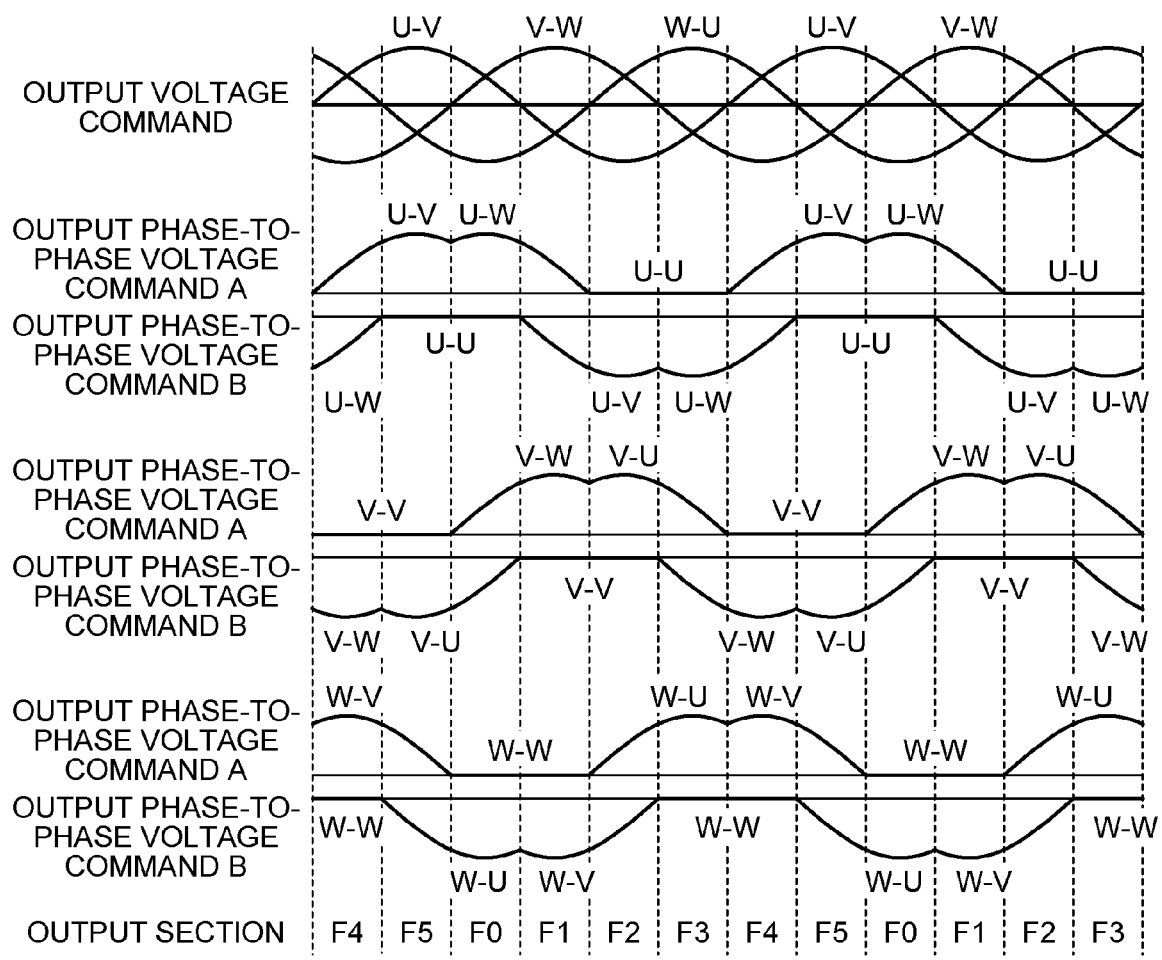
FIG. 13 is an explanatory view of phase-to-phase voltage commands.

A phase-to-phase voltage command is specifically explained with reference to FIG. 13. In the followings, a case where the power conversion direction information Kd indicates the output-direction power conversion is explained as an example. In other words, a case of an operation in the A-mode or the B-mode is explained as an example. FIG. 13 is an explanatory view of output phase-to-phase voltage commands.

As shown in FIG. 13, the PWM-signal generating unit 25 divides a section into the output sections F0 to F5 in which a magnitude relation of the absolute values of the output phase-to-phase voltages Vuv, Vvw, and Vwu does not change, by using the values of the output voltage commands Vu*, Vv*, and Vw*. Then, the PWM-signal generating unit 25 generates output phase-to-phase voltage commands A and B shown in FIG. 13 based on the values of the input phase voltages Vr, Vs, and Vt and the output voltage commands Vu*, Vv*, and Vw*.

The output phase-to-phase voltage command A is an output phase-to-phase voltage command selected when an input phase voltage (hereinafter, middle input phase voltage Vim), whose voltage value is the middle among the input phase voltages Vr, Vs, and Vt, is a positive voltage. For example, in the output section F0 shown in FIG. 13, when the middle input phase voltage Vim is a positive voltage, the PWM-signal generating unit 25 generates the output phase-to-phase voltage command Vuw* and the output phase-to-phase voltage command Vvw* as the output phase-to-phase voltage command A.

On the other hand, the output phase-to-phase voltage command B is an output phase-to-phase voltage command selected when the middle input phase voltage Vim is a negative voltage. For example, in the output section F0 shown in FIG. 13, when the middle input phase voltage Vim is a negative voltage, the PWM-signal generating unit 25 generates the output phase-to-phase voltage command Vvu* and the output phase-to-phase voltage command Vwu* as the output phase-to-phase voltage command B.

Generation of a PWM signal in the output section F0 shown in FIG. 13 is specifically explained with an operation in the B-mode as an example. The relationship between an output phase-to-phase voltage command in the output section F0 and the input sections E0 to E11 is illustrated in Table 6. In the output section F0, the PWM-signal generating unit 25 performs on/off control of the bidirectional switches S according to Table 6. For example, the PWM-signal generating unit 25 stores information on the table shown in Table 6 and performs on/off control of the bidirectional switches S based on the information.

TABLE 6

| | STEP-UP MODE/OUTPUT SECTION F0 (U > V > W) | | | | |
|---|---|---|---|---|---|
| INPUT SECTION | VOLTAGE COMMAND | OUTPUT INTERPHASE | | OFF PERIOD | ON PERIOD |
| SECTION E0 | VOLTAGE | HIGHEST | W-U | Sru, Stu | Sru, Stw |
| (Vr > Vs > Vt, Vs < 0) | COMMAND B | MIDDLE | V-U | Sru, Ssu | Sru, Ssv |
| SECTION E1 | VOLTAGE | HIGHEST | U-W | Srw, Stw | Sru, Stw |
| (Vr > Vs > Vt, Vs > 0) | COMMAND A | MIDDLE | V-W | Ssw, Stw | Ssv, Stw |
| SECTION E2 | VOLTAGE | HIGHEST | U-W | Ssw, Stw | Ssu, Stw |
| (Vs > Vr > Vt, Vr > 0) | COMMAND A | MIDDLE | V-W | Srw, Stw | Srv, Stw |
| SECTION E3 | VOLTAGE | HIGHEST | W-U | Ssu, Stu | Ssu, Stw |

TABLE 6-continued

STEP-UP MODE/OUTPUT SECTION F0 (U > V > W)

| INPUT SECTION | VOLTAGE COMMAND | OUTPUT INTERPHASE | | OFF PERIOD | ON PERIOD |
|---|---|---|---|---|---|
| (Vs > Vr > Vt, Vr < 0) | COMMAND B | MIDDLE | V-U | Sru, Ssu | Srv, Ssu |
| SECTION E4 | VOLTAGE | HIGHEST | W-U | Sru, Ssu | Srw, Ssu |
| (Vs > Vt > Vr, Vt < 0) | COMMAND B | MIDDLE | V-U | Ssu, Stu | Ssu, Stv |
| SECTION E5 | VOLTAGE | HIGHEST | U-W | Srw, Ssw | Srw, Ssu |
| (Vs > Vt > Vr, Vt > 0) | COMMAND A | MIDDLE | V-W | Srw, Stw | Srw, Stv |
| SECTION E6 | VOLTAGE | HIGHEST | U-W | Srw, Stw | Srw, Stu |
| (Vt > Vs > Vr, Vs > 0) | COMMAND A | MIDDLE | V-W | Srw, Ssw | Srw, Ssv |
| SECTION E7 | VOLTAGE | HIGHEST | W-U | Sru, Stu | Srw, Stu |
| (Vt > Vs > Vr, Vs < 0) | COMMAND B | MIDDLE | V-U | Ssu, Stu | Ssv, Stu |
| SECTION E8 | VOLTAGE | HIGHEST | W-U | Ssu, Stu | Ssw, Stu |
| (Vt > Vr > Vs, Vr < 0) | COMMAND B | MIDDLE | V-U | Sru, Stu | Srv, Stu |
| SECTION E9 | VOLTAGE | HIGHEST | U-W | Ssw, Stw | Ssw, Stu |
| (Vt > Vr > Vs, Vr > 0) | COMMAND A | MIDDLE | V-W | Srw, Ssw | Srv, Ssw |
| SECTION E10 | VOLTAGE | HIGHEST | U-W | Srw, Ssw | Sru, Ssw |
| (Vr > Vt > Vs, Vt > 0) | COMMAND A | MIDDLE | V-W | Ssw, Stw | Ssw, Stv |
| SECTION E11 | VOLTAGE | HIGHEST | W-U | Ssu, Sru | Srw, Ssu |
| (Vr > Vt > Vs, Vt < 0) | COMMAND B | MIDDLE | V-U | Stu, Sru | Stu, Sru |

For example, in the output section F0, when the input phase voltages Vr, Vs, and Vt are in a state of belonging to the input section E0, as shown in Table 6, an S-phase voltage Vs that is the middle input phase voltage Vim is a negative voltage. In this case, the PWM-signal generating unit 25 selects the output phase-to-phase voltage command B, and generates the output phase-to-phase voltage command Vwu* as a highest output phase-to-phase voltage command and generates the output phase-to-phase voltage command Vvu* as a middle output phase-to-phase voltage command. Consequently, the highest output phase-to-phase voltage Vohigh becomes between the W-phase and the U-phase and the middle output phase-to-phase voltage Vomid becomes between the V-phase and the U-phase.

Moreover, in the input section E0, the highest input phase-to-phase voltage Vihigh is the input phase-to-phase voltage Vrt and the middle input phase-to-phase voltage Vimid is the input phase-to-phase voltage Vrs. Therefore, in the case of the output section F0 and the input section E0, the PWM-signal generating unit 25 performs a connection control process (hereinafter, described as switch control process) of the bidirectional switches S as follows.

First, the PWM-signal generating unit 25 turns on the bidirectional switches Sru, Ssu, and Stu, and accumulates magnetic energy in the first reactors L1s and L1t in the division as shown in FIG. 9. The bidirectional switch Sru is kept in an on-state in all of the divisions a to e shown in FIG. 9.

Next, in the divisions b to d shown in FIG. 9, for connecting the R-phase and the T-phase, to which the highest input phase-to-phase voltage Vihigh is input, to the U-phase and the W-phase to be the highest output phase-to-phase voltage Vohigh, the PWM-signal generating unit 25 turns off the bidirectional switch Stu and turns on the bidirectional switches Sru and Stw. Because the bidirectional switch Sru is already in an on-state, the PWM-signal generating unit 25 turns on the bidirectional switch Stw to connect the T-phase and the W-phase. The bidirectional switch Stw is turned on by the PWM signal SP1 output from the PWM-signal generating unit 25. Consequently, magnetic energy accumulated in the first reactor L1t is released to the second capacitor C2 was electric energy, so that voltage of the T-phase is stepped up and is output to the W-phase.

Moreover, in the division c shown in FIG. 9, for connecting the R-phase and the S-phase, to which the middle input phase-to-phase voltage Vimid is input, to the U-phase and the W-phase to be the middle output phase-to-phase voltage Vomid, the PWM-signal generating unit 25 turns off the bidirectional switch Ssu and turns on the bidirectional switches Sru and Ssv. Because the bidirectional switch Sru is already in an on-state, the PWM-signal generating unit 25 turns on the bidirectional switch Ssv to connect the S-phase and the V-phase. The bidirectional switch Ssv is turned on by the PWM signal SP2 output from the PWM-signal generating unit 25. Consequently, energy accumulated in the first reactor L1s is released to the second capacitor C2v as electric energy, so that voltage of the S-phase is stepped up and is output to the V-phase.

Moreover, in the output section F0, when the input phase voltages Vr, Vs, and Vt are in the input section E1, the S-phase voltage Vs that is the middle input phase voltage Vim is a positive voltage. In this case, the PWM-signal generating unit 25 selects the output phase-to-phase voltage command A, and generates the output phase-to-phase voltage command Vuw* as a highest output phase-to-phase voltage command and generates the output phase-to-phase voltage command Vvw* as a middle output phase-to-phase voltage command. Consequently, the highest output phase-to-phase voltage Vohigh becomes between the U-phase and the W-phase and the middle output phase-to-phase voltage Vomid becomes between the V-phase and the W-phase.

Moreover, in the input section E1, the highest input phase-to-phase voltage Vihigh is the input phase-to-phase voltage Vrt and the middle input phase-to-phase voltage Vimid is the input phase-to-phase voltage Vst. Therefore, in the case of the output section F0 and the input section E1, the PWM-signal generating unit 25 performs the switch control process of the bidirectional switches S as follows.

First, the PWM-signal generating unit 25 turns on the bidirectional switches Srw, Ssw, and Stw, and accumulates magnetic energy in the first reactors L1r and L1s in the division a shown in FIG. 9. The bidirectional switch Stw is kept in an on-state in all of the divisions a to e shown in FIG. 9.

Next, in the divisions b to d shown in FIG. 9, for connecting the R-phase and the T-phase, to which the highest input phase-to-phase voltage Vihigh is input, to the U-phase and the W-phase to be the highest output phase-to-phase voltage Vohigh, the PWM-signal generating unit 25 turns off the bidirectional switch Srw and turns on the bidirectional switches Sru and Stw. Because the bidirectional switch Stw is already in an on-state, the PWM-signal generating unit 25 turns on the bidirectional switch Sru to connect the R-phase and the U-phase. The bidirectional switch Sru is turned on by the PWM signal SP1 output from the PWM-signal generating unit 25. Consequently, magnetic energy accumulated in the first reactor L1r is released to the second capacitor C2u as electric energy, so that voltage of the R-phase is stepped up and is output to the U-phase.

Moreover, in the division c shown in FIG. 9, for connecting the S-phase and the T-phase, to which the middle input phase-to-phase voltage Vimid is input, to the V-phase and the W-phase to be the middle output phase-to-phase voltage Vomid, the PWM-signal generating unit 25 turns off the bidirectional switch Ssw and turns on the bidirectional switches Ssv and Stw. Because the bidirectional switch Stw is already in an on-state, the PWM-signal generating unit 25 turns on the bidirectional switch Ssv to connect the S-phase and the V-phase. The bidirectional switch Ssv is turned on by the PWM signal SP2 output from the PWM-signal generating unit 25. Consequently, magnetic energy accumulated in the first reactor L1s is released to the second capacitor C2v as electric energy, so that voltage of the S-phase is stepped up and is output to the V-phase.

Moreover, in the input sections E2 to E11, in the similar manner, the PWM-signal generating unit 25 releases magnetic energy accumulated in the first reactor L1 to the second capacitor C2 as electric energy, and steps up voltage of an input phase and outputs it to an output phase.

In this manner, the PWM-signal generating unit 25 performs switching of a state of the bidirectional switches S according to a magnitude relation between input phase voltages and polarity of a middle input phase voltage. Consequently, the PWM-signal generating unit 25 can turn on the bidirectional switch S that connects phases, to which the highest input phase-to-phase voltage Vihigh is input, to phases to be the highest output phase-to-phase voltage Vohigh, and turn on the bidirectional switch S that connects phases, to which the middle input phase-to-phase voltage Vimid is input, to phases to be the middle output phase-to-phase voltage Vomid.

Furthermore, when an input section or an output section is switched, the PWM-signal generating unit 25 performs a step-up operation accurately by performing switching of a state of the bidirectional switches S before and after output section switching as follows. In the followings, output section switching is specifically explained after first specifically explaining input section switching with a step-up operation in the B-mode as an example.

(Input Section Switching)

When an input section is switched, the PWM-signal generating unit 25 starts switching from one of connection states of the bidirectional switches S in the original input section that corresponds to a connection state of the bidirectional switches S in the switched input section.

For example, switching of an input section from the input section E0 to the input section E1 is considered. Table 7 illustrates the bidirectional switches S to be turned on in each of the divisions a to e of the input section E0 or E1 shown in FIG. 9 when an output voltage command is in the output section F0. In each frame in Table 7, the bidirectional switch S described on the left side of "/" is the bidirectional switch S to be turned on in the input section E0 and the bidirectional switch S described on the right side of "/" is the bidirectional switch S to be turned on in the input section E1.

TABLE 7

|  | DIVISION a | DIVISION b | DIVISION c | DIVISION d | DIVISION e |
|---|---|---|---|---|---|
| BIDIRECTIONAL SWITCH TO BE TURNED ON | Sru/Srw Ssu/Ssw Stu/Stw | Sru/Sru Ssu/Ssw Stw/Stw | Sru/Sru Ssv/Ssv Stw/Stw | Sru/Sru Ssu/Ssw Stw/Stw | Sru/Srw Ssu/Ssw Stu/Stw |

As shown in Table 7, the state of all of the bidirectional switches S in the division c is the same between the input section E0 and the input section E1. A hatched frame in Table 7 indicates that the state of the bidirectional switch S is the same between the input section E0 and the input section E1.

Therefore, the PWM-signal generating unit 25 starts switching of an input section from the division c of the original input section E0 where a connection state of the bidirectional switches S corresponds to that in the division c in the switched input section E1. For performing the control, the PWM-signal generating unit 25, for example, uses a table as shown in Table 8.

TABLE 8

|  | DIVISION a | DIVISION b | DIVISION c | DIVISION d | DIVISION e |
|---|---|---|---|---|---|
| BIDIRECTIONAL SWITCH TO BE TURNED ON | Sru Ssu Stu | Sru Ssu Stw | Sru Ssv Stw | Sru Ssw Stw | Srw Ssw Stw |
| INPUT SECTION | E0 | | | E1 | |

In this manner, when an input section is switched, the PWM-signal generating unit 25 starts switching from a division where a connection state of the bidirectional switches S corresponds to that in the same division after switching. With this process, the matrix converter 1 can perform a step-up operation accurately.

Furthermore, for example, when an output voltage command is in the output section F0, switching of an input section from the input section E1 to the input section E2 is considered. Table 9 illustrates the bidirectional switches S to be turned on in each of the divisions a to e in the input sections E1 and E2 shown in FIG. 9. In each frame in Table 9, the bidirectional switch S described on the left side of "/" is the bidirectional switch S to be turned on in the input section E1 and the bidirectional switch S described on the right side of "/" is the bidirectional switch S to be turned on in the input section E2.

TABLE 9

|  | DIVISION a | DIVISION b | DIVISION c | DIVISION d | DIVISION e |
|---|---|---|---|---|---|
| BIDIRECTIONAL SWITCH TO BE TURNED ON | Srw/Srw Ssw/Ssw Stw/Stw | Sru/Ssu Ssw/Ssw Stw/Stw | Sru/Ssu Ssv/Srv Stw/Stw | Sru/Ssu Ssw/Ssw Stw/Stw | Srw/Srw Ssw/Ssw Stw/Stw |

As shown in Table 9, the state of all of the bidirectional switches S in the divisions a and e is the same between the input section E1 and the input section E2. Therefore, the PWM-signal generating unit 25 performs switching of an input section when switching a connection state of the bidirectional switches S from a division where voltage is not output to the load 3 side to a division where voltage is output to the load 3 side. In the division where voltage is output to the load 3 side, energy accumulated in the first reactor L1 is released and a step-up operation can be accurately performed by switching the bidirectional switches S according to an input section at a timing of transferring to the division.

For example, in the case of switching of an input section from the input section E1 to the input section E2, the switching is performed at a timing of transferring from the division a of the input section E1 to the division b of the input section E1. For performing this control, the PWM-signal generating unit 25, for example, uses a table as shown in Table 10.

TABLE 10

|  | DIVISION a | DIVISION b | DIVISION c | DIVISION d | DIVISION e |
|---|---|---|---|---|---|
| BIDIRECTIONAL SWITCH TO BE TURNED ON | Srw Ssw Stw | Ssu Ssw Stw | Ssu Ssw Stw | Ssu Ssw Stw | Srw Ssw Stw |
| CORRESPONDING INPUT SECTION | E1 |  |  | E2 |  |

Moreover, the PWM-signal generating unit 25 can perform switching of an input section when switching a connection state of the bidirectional switches S from a division where voltage is output to the load 3 side to a division where voltage is not output to the load 3 side. In the division where voltage is not output to the load 3 side, magnetic energy is accumulated in the first reactor L1 and a step-up operation can be accurately performed by switching the bidirectional switches S according to an input section at a timing of transferring to the division.

For example, when an output voltage command is in the output section F0, in the case of switching of an input section from the input section E1 to the input section E2, the switching is performed at a timing of transferring from the division d of the input section E1 to the division e of the input section E1. For performing this control, the PWM-signal generating unit 25, for example, uses a table as shown in Table 11.

TABLE 11

|  | DIVISION a | DIVISION b | DIVISION c | DIVISION d | DIVISION e |
|---|---|---|---|---|---|
| BIDIRECTIONAL SWITCH TO BE TURNED ON | Srw Ssw Stw | Sru Ssw Stw | Sru Ssv Stw | Sru Ssw Stw | Srw Ssw Stw |
| INPUT SECTION |  | E1 |  |  | E2 |

As described above, when an input section is switched, the PWM-signal generating unit 25 of the matrix converter 1 selects a division having less effect on a step-up operation among the divisions a to e and performs switching to a corresponding division in the switched input section. Thus, the PWM-signal generating unit 25 includes totally 72 tables for 6 output sections F0 to F5 of an output voltage command with respect to each of 12 cases of switching of an input section, for input section switching. Consequently, a step-up operation can be accurately performed.

(Output Section Switching)

In the above, a case where an input section is switched is explained as an example, and in a case where an output section is switched, switching of a state of the bidirectional switches S is performed in the similar manner by selecting a division having less effect on a step-up operation among the division a to the division e.

The relationship between an output voltage command in the output section F1 and the input sections E0 and E1 is shown in Table 12.

TABLE 12

| STEP-UP MODE/OUTPUT SECTION F1 (V > U > W) | | | | |
|---|---|---|---|---|
| INPUT SECTION | VOLTAGE COMMAND | OUTPUT INTERPHASE | OFF PERIOD | ON PERIOD |
| SECTION E0 (Vr > Vs > Vt, Vs < 0) | VOLTAGE COMMAND B | HIGHEST MIDDLE | W-V U-V | Srv, Stv Srv, Ssv | Srv, Stw Srv, Ssu |
| SECTION E1 (Vr > Vs > Vt, Vs > 0) | VOLTAGE COMMAND A | HIGHEST MIDDLE | V-W U-W | Srw, Stw Ssw, Stw | Srv, Stw Ssu, Stw |
| . | . | . | . | . |
| . | . | . | . | . |

When switching an output section, the PWM-signal generating unit 25 starts switching from one of connection states of the bidirectional switches S in the original output section that corresponds to a connection state of the bidirectional switches S in the switched output section.

For example, in the input section E1, switching of an output section from the output section F0 to the output section F1 is considered. In this case, the bidirectional switches S to be turned on in each of the divisions a to e shown in FIG. 9 in each of the output sections F0 and F1 are shown in Table 13. In each frame in Table 13, in the similar manner to Table 7, the bidirectional switch S described on the left side of "/" is the bidirectional switch S to be turned on in the output section F0 and the bidirectional switch S described on the right side of "/" is the bidirectional switch S to be turned on in the output section F1.

TABLE 13

|  | DIVISION a | DIVISION b | DIVISION c | DIVISION d | DIVISION e |
|---|---|---|---|---|---|
| BIDIRECTIONAL SWITCH TO BE TURNED ON | Srw/Srw Ssw/Ssw Stw/Stw | Sru/Srv Ssw/Ssw Stw/Stw | Sru/Srv Ssv/Ssu Stw/Stw | Sru/Srv Ssw/Ssw Stw/Stw | Srw/Srw Ssw/Ssw Stw/Stw |

In the input section E1, when switching from the output section F0 to the output section F1, as shown in Table 13, the state of all of the bidirectional switches S in the divisions a and e is the same between the output section F0 and the output section F1. In the divisions a and e, the bidirectional switches S are in a state in which voltage is not output. A hatched frame in Table 13 indicates that the state of the bidirectional switches S is the same between the output section F0 and the output section F1.

Therefore, in the input section E1, when performing switching of an output section from the output section F0 to the output section F1, the PWM-signal generating unit 25 transfers the state of the bidirectional switches S from the division a in the original output section F0 to the division b in the switched output section F1. Moreover, the PWM-signal generating unit 25 can also transfer the state of the bidirectional switches S from the division d in the original output section F0 to the division e in the switched output section F1. For performing the control, in the similar manner to the above, the PWM-signal generating unit 25 includes totally 72 tables for 12 output sections E0 to E11, which are sections of an input voltage, with respect to each of 6 cases of switching of an output section, for output section switching.

In a case of switching of an output section also, in the similar manner to a case of switching of an input section, some output sections are in a state where the bidirectional switches S are in a state of outputting voltage in a division in which the state of all of the bidirectional switches S is the same before and after switching. In such an output section, the PWM-signal generating unit 25 performs switching of an output section when switching from a state where voltage is output to the load 3 side to a state where voltage is not output to the load 3 side. Moreover, the PWM-signal generating unit 25 performs switching of an output section when switching from a state where voltage is not output to the load 3 side to a state where voltage is output to the load 3 side in some cases.

(Switching Between Step-Down Operation and Step-Up Operation)

In the above, explanation is made for performing switching of a state of the bidirectional switches S at a predetermined timing when an input section or an output section is switched in the B-mode, however, in a case of transferring from a step-down operation to a step-up operation also, switching of a state of the bidirectional switches S can be performed at a predetermined timing. This point is specifically explained below.

In this embodiment, as an example, the switch control process of switching from the A-mode to the B-mode in a case of the input section E1 and the output section F0 is explained. Table 14 illustrates a relationship between an output voltage command in the output section F0 and the input sections E0 and E1.

TABLE 14

| STEP-DOWN MODE/OUTPUT SECTION F0 (U > V > W) | | | | |
|---|---|---|---|---|
| INPUT SECTION | VOLTAGE COMMAND | OUTPUT INTERPHASE | OFF PERIOD | ON PERIOD |
| SECTION E0 (Vr > Vs > Vt, Vs < 0) | VOLTAGE COMMAND B | HIGHEST W-U | Sru, Srw | Sru, Stw |
| | | MIDDLE V-U | Sru, Srv | Sru, Ssv |
| SECTION E1 (Vr > Vs > Vt, Vs > 0) | VOLTAGE COMMAND A | HIGHEST U-W | Stu, Stw | Sru, Stw |
| | | MIDDLE V-W | Stv, Stw | Ssv, Stw |
| . | . | . | . | . |
| . | . | . | . | . |
| . | . | . | . | . |

When switching from a step-down operation to a step-up operation, the PWM-signal generating unit 25 starts switching from one of connection states of the bidirectional switches S before switching that corresponds to a connection state of the bidirectional switches S after switching.

For example, in a case of the input section E1 and the output section F0, the bidirectional switches S to be turned on in the A-mode and the B-mode in each of the divisions a to e shown in FIG. 9 are illustrated in Table 15. In the similar manner to Table 7, in each frame in Table 15, the bidirectional switch S described on the left side of "/" is the bidirectional switch S to be turned on in the A-mode and the bidirectional switch S described on the right side of "/" is the bidirectional switch S to be turned on in the B-mode.

TABLE 15

| | DIVISION a | DIVISION b | DIVISION c | DIVISION d | DIVISION e |
|---|---|---|---|---|---|
| BIDIRECTIONAL SWITCH TO BE TURNED ON | Sru/Sru Srv/Ssu Srw/Stu | Sru/Sru Srv/Ssu Stw/Stw | Sru/Sru Ssv/Ssv Stw/Stw | Sru/Sru Srv/Ssu Stw/Stw | Sru/Sru Srv/Ssu Srw/Stu |

When switching from the A-mode to the B-mode in a state of the input section E0 and the output section F0, as shown in Table 15, the state of the bidirectional switches S in the division c is exactly the same between the A-mode and the B-mode. A hatched frame in Table 15 indicates that the state of the bidirectional switches S is the same between the A-mode and the B-mode.

Therefore, when switching from the A-mode to the B-mode, the PWM-signal generating unit 25 starts switching from the division c in the A-mode before switching where a connection state of the bidirectional switches S corresponds to that in the division c in the B-mode after switching.

For performing this control, the PWM-signal generating unit 25, for example, uses a table as shown in Table 16. The PWM-signal generating unit 25 performs switching from the A-mode to the B-mode before the start of the division d after the start of the division c according to Table 2.

TABLE 16

| | DIVISION a | DIVISION b | DIVISION c | DIVISION d | DIVISION e |
|---|---|---|---|---|---|
| BIDIRECTIONAL SWITCH TO BE TURNED ON | Sru Srv Srw | Sru Srv Stw | Sru Ssv Stw | Sru Ssu Stw | Sru Ssu Stu |
| MODE | | A-MODE | | B-MODE | |

The control is the same, for example, in a case of switching from the B-mode to the A-mode in a state of the input section E0 and the output section F0. In this case, the PWM-signal generating unit 25, for example, uses a table as shown in Table 17. The PWM-signal generating unit 25 performs switching from the B-mode to the A-mode before the start of the division d after the start of the division c according to Table 17.

TABLE 17

| | DIVISION a | DIVISION b | DIVISION c | DIVISION d | DIVISION e |
|---|---|---|---|---|---|
| BIDIRECTIONAL SWITCH TO BE TURNED ON | Sru Ssu Stu | Sru Ssu Stw | Sru Ssv Stw | Sru Srv Stw | Sru Srv Srw |
| MODE | | B-MODE | | A-MODE | |

In this manner, in a case of switching from a step-down operation to a step-up operation and a case opposite thereto, the PWM-signal generating unit 25 starts switching from one of connection states of the bidirectional switches S before switching that corresponds to a connection state of the bidirectional switches S after switching according to a table. The PWM-signal generating unit 25 includes totally 144 tables, which are necessary for switching between a step-up operation and a step-down operation, for 72 cases determined by 12 input sections E0 to E11 and 6 output sections F0 to F5, with respect to each of step-up→step-down switching and step-down→step-up switching. With this process, the matrix converter 1 can promptly perform transfer from a step-down operation to a step-up operation.

Moreover, in the above, the switch control process relating to the B-mode is explained, however, the PWM-signal generating unit 25 can perform the switch control process relating to the D-mode in the similar manner. Consequently, in the D-mode, a step-up operation can be performed accurately. Moreover, transfer from the C-mode to the D-mode and transfer from the D-mode to the C-mode can be performed promptly.

Moreover, the PWM-signal generating unit 25 can perform the switch control process relating to the A-mode and the C-mode in the similar manner to the switch control process relating to the B-mode and the D-mode. Consequently, the switch control process in each mode can be performed in the similar manner, so that the switch control process can be avoided from being complicated as a whole.

As above, the control unit 20 of the matrix converter 1 according to the embodiment turns on the bidirectional switch S that connects phases, to which a highest phase-to-phase voltage is input among input phase-to-phase voltages, to phases to be a highest phase-to-phase voltage among output phase-to-phase voltages. Moreover, the control unit 20 turns on the bidirectional switch S that connects phases, to which a middle phase-to-phase voltage is input among input phase-to-phase voltages, to phases to be a middle phase-to-phase voltage among output phase-to-phase voltages. Consequently, control of the bidirectional switches S can be easily performed.

Moreover, in a case of the output-direction power conversion, the control unit 20 performs switching of a state of the bidirectional switches S according to a magnitude relation between phase voltages on an input side and polarity of a middle phase voltage on an input side. Then, the control unit 20 starts switching of a state of the bidirectional switches S from one of connection states of the bidirectional switches S before switching that corresponds to a connection state of the bidirectional switches S after switching. Consequently, for example, in a case of a step-up operation, step-up control can be accurately performed.

Moreover, in a case of the input-direction power conversion, the control unit 20 performs switching of a state of the bidirectional switches S according to a magnitude relation between phase voltages on an output side and polarity of a middle phase voltage on an output side and starts switching of a state of the bidirectional switches S from one of connection states of the bidirectional switches S before switching that corresponds to a connection state of the bidirectional switches S after switching. Consequently, for example, in a case of a step-up operation, step-up control can be accurately performed.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A matrix converter comprising:
a power conversion unit that includes a plurality of bidirectional switches that connect each phase of an AC source and each phase of a load; and
a control unit that controls the bidirectional switches, wherein
the control unit is configured to generate a highest phase-to-phase voltage among load side phase-to-phase voltages by successive voltage pulses, each of the voltage pulses being generated by controlling bidirectional switches that connect phases with respect to the highest phase-to-phase voltage and phases with respect to a highest phase-to-phase voltage among AC-source side phase-to-phase voltages in each pulse period, and the control unit is configured to generate a middle phase-to-phase voltage among the load side phase-to-phase voltages by successive voltage pulses, each of the voltage pulses being generated by controlling bidirectional switches that connect phases with respect to the middle phase-to-phase voltage and phases with respect to a middle phase-to-phase voltage among the AC-source side phase-to-phase voltages in each pulse period.

2. The matrix converter according to claim 1, wherein the control unit performs switching between connection control processes of the bidirectional switches according to a magnitude relation between phase voltages on the AC source side and polarity of a middle phase voltage on the AC source side, and starts the switching between the connection control processes from one state of connection states of the bidirectional switches in one connection control process before the switching that corresponds to a connection state of the bidirectional switches in another connection control process after the switching, and
the control unit performs the another connection control process from the connection state corresponding to the one state.

3. The matrix converter according to claim 1, wherein the control unit performs switching between connection control processes of the bidirectional switches according to a magnitude relation between phase voltages on the load side and polarity of a middle phase voltage on the load side, and starts the switching of the connection control processes from one of connection states of the bidirectional switches in one connection control process before the switching that corresponds to a connection state of the bidirectional switches in another connection control process after the switching.

4. The matrix converter according to claim 2, wherein the control unit performs switching between connection control processes of the bidirectional switches according to a magnitude relation between phase voltages on the load side and polarity of a middle phase voltage on the load side, and starts the switching of the connection control processes from one of connection states of the bidirectional switches in one connection control process before the switching that corresponds to a connection state of the bidirectional switches in another connection control process after the switching.

5. The matrix converter according to claim 1, further comprising:
a plurality of first reactors each connected between a corresponding phase of the AC source and the power conversion unit;
a plurality of second reactors each connected between a corresponding phase of the load and the power conversion unit;
a plurality of first capacitors that connect between phases of the power conversion unit on the AC source side via a first switch; and
a plurality of second capacitors that connect between phases of the power conversion unit on the load side via a second switch, wherein
the control unit performs a step-up operation and a step-down operation between the AC source side and the load side by controlling the first switch, the second switch, and the bidirectional switches.

6. The matrix converter according to claim 2, further comprising:
a plurality of first reactors each connected between a corresponding phase of the AC source and the power conversion unit;
a plurality of second reactors each connected between a corresponding phase of the load and the power conversion unit;
a plurality of first capacitors that connect between phases of the power conversion unit on the AC source side via a first switch; and
a plurality of second capacitors that connect between phases of the power conversion unit on the load side via a second switch, wherein
the control unit performs a step-up operation and a step-down operation between the AC source side and the load side by controlling the first switch, the second switch, and the bidirectional switches.

7. The matrix converter according to claim 5, wherein the control unit performs switching between connection control processes of the bidirectional switches according to a magnitude relation between phase voltages on the load side, and starts the switching between the connection control processes from one of connection states of the bidirectional switches in one connection control process before the switching that corresponds to a connection state of the bidirectional switches in another connection control process after the switching, or when switching a connection state of the bidirectional switches from a state where voltage is not output to the load side to a state where voltage is output to the load side, or when switching a connection state of the bidirectional switches from a state where voltage is output to the load side to a state where voltage is not output to the load side.

8. The matrix converter according to claim 6, wherein the control unit performs switching between connection control processes of the bidirectional switches according to a magnitude relation between phase voltages on the load side, and starts the switching between the connection control processes from one of connection states of the bidirectional switches in one connection control process before the switching that corresponds to a connection state of the bidirectional switches in another connection control process after the switching, or when switching a connection state of the bidirectional switches from a state where voltage is not output to the load side to a state where voltage is output to the load side, or when switching a connection state of the bidirectional switches from a state where voltage is output to the load side to a state where voltage is not output to the load side.

9. The matrix converter according to claim 5, wherein the control unit turns on a switch connected to a step-up side and turns off a switch connected to a step-down side, among the first switch and the second switch.

10. The matrix converter according to claim 6, wherein the control unit turns on a switch connected to a step-up side and turns off a switch connected to a step-down side, among the first switch and the second switch.

11. The matrix converter according to claim 7, wherein the control unit turns on a switch connected to a step-up side and turns off a switch connected to a step-down side, among the first switch and the second switch.

12. The matrix converter according to claim 8, wherein the control unit turns on a switch connected to a step-up side and turns off a switch connected to a step-down side, among the first switch and the second switch.

13. The matrix converter according to claim 5, wherein the control unit performs switching from one operation to another operation among the step-up operation and the step-down operation when switching a connection state of the bidirectional switches from a state where voltage is output to the load side to a state where voltage is not output to the load side.

14. The matrix converter according to claim 6, wherein the control unit performs switching from one operation to another operation among the step-up operation and the step-down operation when switching a connection state of the bidirectional switches from a state where voltage is output to the load side to a state where voltage is not output to the load side.

15. The matrix converter according to claim 1, wherein the control unit selects a highest phase-to-phase voltage among the AC-source side phase-to-phase voltages and a middle phase-to-phase voltage among the AC-source side phase-to-phase voltages based on a phase obtained by adding a predetermined phase difference to a phase of a phase voltage on the AC source side.

16. The matrix converter according to claim 2, wherein the control unit judges a magnitude relation between the phase voltages on the AC source side and polarity of the middle phase voltage based on a phase obtained by adding a predetermined phase difference to a phase of a phase voltage on the AC source side.

17. The matrix converter according to claim 5, wherein the control unit judges a magnitude relation between the phase voltages on the AC source side and polarity of the middle phase voltage based on a phase obtained by adding a predetermined phase difference to a phase of a phase voltage on the AC source side.

18. The matrix converter according to claim 6, wherein the control unit judges a magnitude relation between the phase voltages on the AC source side and polarity of the middle phase voltage based on a phase obtained by adding a predetermined phase difference to a phase of a phase voltage on the AC source side.

19. A matrix converter comprising:
a power conversion means that includes a plurality of switching means that connect each phase of an AC source and each phase of a load; and
a control means for controlling the switching means, wherein
the control means is configured to generate a highest phase-to-phase voltage among load side phase-to-phase voltages by successive voltage pulses, each of the voltage pulses being generated by controlling switching means for connecting phases with respect to the highest phase-to-phase voltage and phases with respect to a highest phase-to-phase voltage among AC-source side phase-to-phase voltages in each pulse period, and the control means is configured to generate a middle phase-to-phase voltage among the load side phase-to-phase voltages by successive voltage pulses, each of the voltage pulses being generated by controlling switching means for connecting phases with respect to the middle phase-to-phase voltage and phases with respect to a middle phase-to-phase voltage among the AC-source side phase-to-phase voltages in each pulse period.

20. A method of controlling a matrix converter including a power conversion unit that includes a plurality of bidirectional switches that connect each phase of an AC source and each phase of a load, and a control unit that controls the bidirectional switches, said method comprising:

generating, using the control unit, a highest phase-to-phase voltage among load side phase-to-phase voltages by successive voltage pulses, each of the voltage pulses being generated by controlling bidirectional switches that connect phases with respect to the highest phase-to-phase voltage and phases with respect to a highest phase-to-phase voltage among AC-source side phase-to-phase voltages in each pulse period; and generating, using the control unit, a middle phase-to-phase voltage among the load side phase-to-phase voltages by successive voltage pulses, each of the voltage pulses being generated by controlling bidirectional switches that connect phases with respect to the middle phase-to-phase voltage and phases with respect to a middle phase-to-phase voltage among the AC-source side phase-to-phase voltages in each pulse period.

* * * * *